US009211606B2

(12) United States Patent
Tiberghien

(10) Patent No.: US 9,211,606 B2
(45) Date of Patent: Dec. 15, 2015

(54) SHEET METAL CLAMP USED IN COMBINATION WITH A MANIPULATOR ARM, AND HAVING AN ELECTROMECHANICAL BALANCING MODULE

(75) Inventor: Olivier Tiberghien, Saint Cyr sur Loire (FR)

(73) Assignee: Aro Welding Technologies, Chateau du Loir (FR)

( * ) Notice: Subject to any disclaimer, the term of this patent is extended or adjusted under 35 U.S.C. 154(b) by 1309 days.

(21) Appl. No.: 12/303,030

(22) PCT Filed: Jun. 29, 2007

(86) PCT No.: PCT/FR2007/051568
§ 371 (c)(1),
(2), (4) Date: Mar. 24, 2009

(87) PCT Pub. No.: WO2008/003891
PCT Pub. Date: Jan. 10, 2008

(65) Prior Publication Data
US 2010/0025383 A1  Feb. 4, 2010

(30) Foreign Application Priority Data
Jul. 3, 2006 (FR) ...................................... 06 06006

(51) Int. Cl.
*B23K 11/11* (2006.01)
*B23K 11/31* (2006.01)

(52) U.S. Cl.
CPC ............. *B23K 11/115* (2013.01); *B23K 11/314* (2013.01); *B23K 11/315* (2013.01); *B23K 11/317* (2013.01)

(58) Field of Classification Search
CPC ........ B25J 15/00; B25J 15/02; B23K 11/115; B23K 11/314; B23K 11/315; B23K 11/317; B23K 11/31

USPC ........ 72/71, 325, 476, 703; 219/86.25, 86.41, 219/86.51, 86.61, 89, 119, 90, 91.1
See application file for complete search history.

(56) References Cited

U.S. PATENT DOCUMENTS 2,193,977 A * 3/1940 Martin ............................ 219/89
2,272,968 A * 2/1942 Dyer ............................ 219/86.9
(Continued)

FOREIGN PATENT DOCUMENTS

DE    38 40 636    6/1990
DE    202 14 970   1/2004
(Continued)

OTHER PUBLICATIONS

International Search Report from counterpart application No. PCT/FR2007/05568; Report dated Nov. 22, 2007.
(Continued)

*Primary Examiner* — Samuel M Heinrich
(74) *Attorney, Agent, or Firm* — Miller, Matthias & Hull LLP

(57) ABSTRACT

The clamp comprises a balancing module that provides one degree of freedom between the mounting and the mobile subassembly that connects together the fixed and mobile arms and a main actuator, and this module has a device for moving this mobile subassembly relative to the mounting in this degree of freedom, for example in translation, the balancing system comprising a flexible device which is connected to the mobile subassembly and which applies a force, in said degree of freedom, to at least one member connected to the mounting, and, in addition, at least one balancing actuator for moving the mobile subassembly to a balanced position relative to the mounting. Particularly applicable to electrical resistance welding clamps.

29 Claims, 26 Drawing Sheets

(56) References Cited

U.S. PATENT DOCUMENTS

| | | | | |
|---|---|---|---|---|
| 2,293,338 A * | 8/1942 | Harris | | 219/89 |
| 2,312,938 A * | 3/1943 | Stieglitz | | 219/89 |
| 2,432,750 A * | 12/1947 | Goldsworthy | | 219/78.14 |
| 2,453,320 A * | 11/1948 | Huebner | | 219/120 |
| 2,460,759 A * | 2/1949 | Martin et al. | | 219/89 |
| 2,460,889 A * | 2/1949 | Larsen | | 219/120 |
| 2,465,456 A * | 3/1949 | Johnson | | 219/89 |
| 2,492,551 A * | 12/1949 | Brunberg | | 219/86.41 |
| 3,251,483 A * | 5/1966 | Devol | | 414/728 |
| 3,912,900 A * | 10/1975 | Arnett | | 219/56.21 |
| 3,958,098 A * | 5/1976 | Iizuka et al. | | 219/126 |
| 3,975,143 A * | 8/1976 | Diepeveen | | 432/5 |
| 4,020,316 A * | 4/1977 | Schaft et al. | | 219/103 |
| 4,099,044 A * | 7/1978 | Blair et al. | | 219/82 |
| 4,130,750 A * | 12/1978 | Bennett et al. | | 219/78.15 |
| 4,288,024 A * | 9/1981 | Nippert | | 228/155 |
| 4,607,150 A * | 8/1986 | Bannister | | 219/121.63 |
| 4,754,116 A * | 6/1988 | Naruse et al. | | 219/78.01 |
| 4,766,282 A * | 8/1988 | Riordan et al. | | 219/86.25 |
| 4,820,152 A * | 4/1989 | Warrin et al. | | 433/86 |
| 4,825,031 A * | 4/1989 | Heideman | | 219/89 |
| 4,904,839 A * | 2/1990 | Tan et al. | | 219/119 |
| 5,066,845 A * | 11/1991 | Anderson | | 219/119 |
| RE33,798 E * | 1/1992 | Waltonen | | 83/529 |
| 5,157,234 A * | 10/1992 | Umeda | | 219/89 |
| 5,331,130 A * | 7/1994 | Kirker | | 219/86.51 |
| 5,510,595 A * | 4/1996 | Gainand | | 219/124.34 |
| 5,705,783 A * | 1/1998 | Baustert | | 219/89 |
| 5,958,262 A | 9/1999 | Palko | | |
| 6,479,783 B2 * | 11/2002 | Tiberghien et al. | | 219/86.32 |
| 6,653,589 B2 * | 11/2003 | Dolton et al. | | 219/76.14 |
| 6,911,615 B2 * | 6/2005 | Reischmann | | 219/86.51 |
| 7,012,213 B2 * | 3/2006 | Jeon | | 219/119 |
| 7,022,934 B1 * | 4/2006 | Pratt | | 219/119 |
| 7,145,097 B2 * | 12/2006 | Leach et al. | | 219/110 |
| 2001/0015346 A1 * | 8/2001 | Kanjo | | 219/109 |
| 2002/0014474 A1 * | 2/2002 | Tiberghien et al. | | 219/86.32 |
| 2002/0017505 A1 * | 2/2002 | Dolton et al. | | 219/76.14 |
| 2002/0125219 A1 * | 9/2002 | Janssens et al. | | 219/86.41 |
| 2004/0173578 A1 * | 9/2004 | Leach et al. | | 219/110 |
| 2004/0251239 A1 * | 12/2004 | Hochhalter et al. | | 219/86.1 |
| 2005/0150873 A1 * | 7/2005 | Schmitt-Walter et al. | | 219/86.32 |
| 2005/0230362 A1 * | 10/2005 | Stieglbauer et al. | | 219/119 |
| 2005/0236373 A1 * | 10/2005 | Hidaka | | 219/119 |
| 2006/0131281 A1 * | 6/2006 | Stieglbauer et al. | | 219/119 |
| 2009/0091149 A1 * | 4/2009 | Chevassu et al. | | 294/92 |

FOREIGN PATENT DOCUMENTS

| | | |
|---|---|---|
| DE | 20214970 U1 * | 2/2004 |
| JP | 2000218377 A * | 8/2000 |
| WO | WO 02078892 A1 * | 10/2002 |
| WO | WO 03/008146 | 1/2003 |

OTHER PUBLICATIONS

Preliminary Search Report and Written Opinion from French priority application No. FR 06 06006; dated Mar. 7, 2007.

* cited by examiner

SHEET METAL CLAMP USED IN COMBINATION WITH A MANIPULATOR ARM, AND HAVING AN ELECTROMECHANICAL BALANCING MODULE

CROSS-REFERENCE TO RELATED APPLICATIONS

This application is a U.S. national stage filing of International Patent Application No. PCT/FR2007/051568 filed on Jun. 29, 2007, which claims priority under the Paris Convention to French Patent Application No. 06 06006, filed on Jul. 3, 2006.

FIELD OF THE DISCLOSURE

This invention relates to any type of clamp intended to grip sheet metal and used in association with a manipulating arm, called a robot. Said robot can be used either to move the tool around the sheet assembly to be produced or, conversely, to move the assembly in front of the tool, itself then attached to a rigid foot.

BACKGROUND OF THE DISCLOSURE

More specifically, this invention relates to clamps as defined above, of the general type including a rigid frame, associated with a support such as a rigid foot or the robot, a mobile subassembly, associated with the frame and itself comprising a first so-called stationary arm, a second so-called mobile arm and a main actuator, capable of moving the mobile arm with respect to the stationary arm, according to a first degree of freedom, in translation or rotation, so as to close or open the clamp, in order, respectively, to grip a sheet metal assembly between the stationary and mobile arms (brought together by the actuator) or to release the sheet metal assembly (by separating the arms from one another by the actuator), which lamp also comprises a balancing module, introducing an additional degree of freedom between said support and an assembly integrating said mobile subassembly, so as to balance the forces exerted on the ends, respectively, of the stationary and mobile arms in the closed position, in which said balancing module comprises:
- a device enabling a movement according to said additional degree of freedom, in translation, rotation or combination of the two, of said mobile subassembly with respect to the support, and
- a balancing system including a flexible device, associated with said mobile subassembly and urging, according to said additional degree of freedom, at least one member associated with said support.

In one application, in which the invention is of the greatest value for the applicant, the clamp is a clamp for welding by electrical resistance, in which case respectively the ends of the stationary and mobile arms are welding electrodes, respectively stationary and mobile. Similarly, the additional degree of freedom for performing the balancing operation can be a translation with a guide device, and the flexible device includes at least one balancing spring that extends parallel to the direction of movement in translation and, advantageously, consists of at least one pair of opposing springs working in compression.

On this type of clamp for welding by electrical resistance, belonging to the prior art, depending on the work to be performed, two kinematics are possible for the mobile arm and electrode:

- the first degree of freedom is a translation of the mobile arm and electrode with respect to the stationary arm holding the stationary electrode, by linear guidance provided by the main actuator, which is a linear actuator of any suitable type known, hydraulic, pneumatic, mechanical, electric, which directly moves the mobile arm and electrode, in which the clamp is then said to be C- or J-clamps, as shown in the appended FIGS. 1 to 3, or
- the first degree of freedom is a rotation of the mobile arm and electrode, around a pin on the frame, with respect to the stationary arm holding the stationary electrode, in which the clamps are then said to be X- or scissor-clamps, and in which the welding actuator can be a linear actuator, of the cylinder type, mounted either pivotally by its body on the stationary arm support around a pin parallel to the pivot pin of the mobile arm and electrode, or attached rigidly to this same stationary arm support, in which a suitable mechanical connection with two degrees of freedom then enables the rod of the cylinder moving linearly in a given direction to follow the pivoting movements of the mobile arm around the pivot pin. The pivot force of the mobile arm and electrode is transmitted from the actuator to the mobile arm by a lever, to which the mobile arm is secured, pivoting about the pivot pin, and on which the end of the rod of the actuator pivots, as shown in the appended FIG. 4.

In FIGS. 1 to 4, the same references designate identical or equivalent components in the C- and X-clamps, shown in the various positions described below.

To ensure the electric spot welding of a sheet metal assembly 1, the C-clamp of FIGS. 1 to 3 includes primarily a stationary electrode 2 mounted at the end of a stationary arm 3 secured to a support of the stationary arm 3 and/or the body 5 of a main or welding actuator 4, for example of the pneumatic cylinder type, of which the piston 6 and the rod 7 are secured in movement with a mobile arm 8, guided by the support 5 and in the extension of the rod 7, and of which the free end supports a mobile electrode 9, in which said components form a subassembly mounted so that it is mobile, according to an additional degree of freedom that, in these figures, also corresponds to a translation, on a frame 10 rigidly attached to a support, which can be a manipulating robot or a rigid foot, in which said additional degree of freedom of the subassembly (2-9) with respect to the frame 10 is obtained by a module 11 described below.

Similarly, in the X-clamp of FIG. 4, the stationary electrode 2 and the stationary arm 3 are secured to a rigid arm support 12 mounted on a pivot pin 13 around which a rigid lever 14 supporting the mobile arm 8 and the mobile electrode 9 pivots, in which the welding actuator 4, also linear, pivots by its body 5 on the support 12 around a pin 15 parallel to pin 13, while the free end of the rod 7 of the actuator 4 actuates the lever 14, on which the rod 7 pivots around a pin 16 also parallel to pin 13, so as to control the pivoting of the mobile arm 8 and electrode 9 with respect to the stationary arm 3 and electrode 2 by rotation around the pin 13 supported by a rigid console 17 of the frame 10 of the tool, rigidly attached to the tool support (stationary foot or manipulating robot).

An additional degree of freedom, which is a rotation, is given to the subassembly of the stationary and mobile arms (3, 8) and electrodes (2, 9) and the welding actuator 4 with respect to the frame 10 by pivoting of said subassembly with the arm support 12 and the lever 14 around the pin 13 owing to a module 21, of which the structure and the functions are described below.

When the welding assembly process, which can begin once the sheet metal 1 is gripped between the electrodes 2 and 9, is automated, the clamp or the sheet metal assembly 1 to be welded is carried out the end of a pivotally connected arm of a manipulating robot. However, in the most common realization of the welding process, as described below, the clamp is transported by the robot and positioned in front of the sheet metal assembly 1, with the problem being the same in the reverse case in which the sheet metal assembly t is transported and positioned in front of the clamp.

According to the path programming, the robot positions the stationary electrode 2 of the clamp in front of the sheet metal assembly 1 to be welded. However, for technical reasons associated with:

the robot positioning precision;
uncertainty regarding the geometry of the clamp (tolerance for machining and assembly of components, possible wear of electrodes 2 and 9 in the process); and
the error concerning the actual position of the sheet metal assembly 1 with respect to its theoretical position, it is necessary, when programming the robot, to provide a certain distance between the theoretical position of the stationary electrode 2 at the end of the stationary arm 3 and the theoretical position of the sheet metal assembly 1.

This distance must make it possible, during dynamic robot movement phases, to guarantee any absence of contact between the electrode 2 of the stationary arm 3 and the sheet metal assembly 1, so as to prevent any friction and/or contact of said electrode 2 on the sheet metal 1, causing marks, scratches or deformations of the sheet metal 1.

In practice, in the case of a resistance welding process, the value of this distance is between around 5 mm and around 15 mm and is called the relief course.

After this phase of positioning the clamp with respect to the sheet metal assembly 1, the additional degree of freedom mentioned above is released on the clamp, so that the mobile subassembly integrating the stationary and mobile electrodes and arms (2, 3, 8 and 9) and the welding actuator 4 can then perform a relative movement with respect to its frame 10, which relative movement, allowed by the aforementioned module 11 or 21, can be a translation, parallel to that or the mobile arm 8, as in the C-clamp of FIGS. 1 to 3, or a rotation around pin 13, as in the X-clamp of FIG. 4, which operation, called a docking operation, is intended to enable the electrode 2 of the stationary arm 3 to come into contact with the sheet metal assembly 1 to be welded.

Ideally, this docking movement must be performed fully, without creating any force or shock capable of deforming the sheet metal 1, even though said movement must be performed without knowing precisely the difference between the theoretical and actual positions of the sheet metal assembly 1 and the stationary electrode 2, for different masses of the clamp and different positions of its center of gravity, and regardless of the tilt of the clamp in space.

After or simultaneously to this docking operation, the welding actuator 4 is controlled and moves the mobile arm 8 so that the mobile electrode 9 closes in toward the stationary electrode 2 by gripping, between the two electrodes 2 and 9, the sheet metal assembly 1. After the mobile electrode 9 comes into contact with the sheet metal 1, a phase of applying and increasing the welding force takes place. However, in an empty closing of the clamp (in the absence of sheet metal 1), the position of the point of contact between the stationary 2 and mobile 9 electrodes drifts according to the difference in flexibility between the stationary arm 3 and the mobile arm 8, with the magnitude of this drift or movement being directly proportional to the value of the force applied.

Consequently, to prevent any deformation of the sheet metal 1, it is necessary for the position of the clamp (its electrodes 2 and 9) to be corrected throughout the phase of increasing the force, so that the point of contact between the electrodes 2 and 9 constantly corresponds to the actual position of the sheet metal assembly 1, with this operation being called the operation of balancing or centering the clamp on the sheet metal assembly 1.

As for the docking operation, for a clamp with a defined mass, this balancing operation must ideally be capable of being performed independently and with the same quality for all tilts of the clamp in space.

In general, when the natural point of contact between electrodes 2 and 9 is moved to the side of the stationary arm 3, we refer to under-docking, and, conversely, when this natural point of contact is moved to the side of the mobile arm 8, we refer to over-docking.

The consequences of a docking operation and/or a balancing operation improperly or not performed are a risk of producing a deformation in the sheet metal 1, which would be irreversible due to exceeding an elastic limit constraint of this same sheet metal once the welding assembly has been performed, and an imbalance in the force between the two electrodes 2 and 9 (loss of force on the stationary akin 3 in the case of over-docking, increase in force in the case of under-docking), which is detrimental to the quality of the assembly process. Indeed, the magnitude of the deformation of the sheet metal 1 with respect to the imbalance in force between the two electrodes 2 and 9 is a function of the rigidity of the assembly and the position of the gripping means.

Finally, after the docking and balancing operations, the welding operation can be performed with the creation of the assembly point. After this, it is necessary to perform an operation of returning and holding the clamp in the reference position, called the relief operation. In the so-called relief operation, the two electrodes 2 and 9 are moved away from the sheet metal assembly 13 to an initial position from which the docking operation, for the next welding point, can be controlled. Ideally, the balancing operation must be capable of being performed for all orientations of the clamp in space and preferably independently without any particular adjustment.

As indicated above, in applications in which the clamp is attached to a support and the sheet metal assembly 1 to be welded is transported by a manipulating robot, the problem remains the same, still requiring operations of docking and balancing the clamp on the sheet metal assembly 1, then of relief (return to the reference position), only the tilt of the clamp, in this case, is no longer a variable.

In the resistance welding clamps of the prior art and of the type indicated to above, according to FIGS. 1 to 4, the docking, balancing and relief operations are made possible by the additional degree of freedom, by translation of the mobile subassembly (2, 3, 4, 8, 9) with respect to the frame 10 on the C-clamps, or by pivoting (rotation) of the mobile subassembly around a pin 13 or the frame 10 on the X-clamps, and are ensured owing to module 11 or 21, respectively in the C- or X-clamps, essentially including at least one cassette 11a or 21a for guiding in translation and resilient balance by springs, and at least one actuator 11b or 21b for docking, relief and locking and holding the mobile subassembly in the relief position, which actuator 11b or 24b can have, when the guide cassette does not have a balancing spring, at least two resilient balancing means opposing and urging at least one member of said actuator that is secured in movement to said cassette, for example a pneumatic actuator with two pressurized gas chambers on each side of a piston rigidly connected by the rod of the actuator to a slide mounted so as to slide in translation into the cassette, so as to produce two opposing resilient balancing means.

In the balancing modules 11 of FIGS. 1 to 3 and 21 of FIG. 4, the docking and relief functions are associated with the balancing function, and the means for implementing these three functions are combined, and enable either a linear movement of the mobile subassembly, also called a cart, including the two arms 3, 8, the two electrodes 2, 9 and the welding actuator 4, with respect to the frame 10 rigidly attached to the support (see FIGS. 1 to 3), or a rotation movement of the mobile subassembly with respect to the frame 10 (see FIG. 4).

In FIGS. 1 to 4, each of the balancing modules 11 and 21 include a linear guide cassette 11a or 21a, also performing the additional function of docking and balancing by opposing springs, and a linear relief actuator 11b or 11b.

When the three functions combined are performed by pivoting (rotation) movements of the mobile subassembly with respect to the frame 10, the implementation means can be transposed from those mentioned above, and include at least one rotary relief actuator as well as at least one cassette for guiding in rotation and docking and balancing by at least two opposing torsion springs.

In FIGS. 1 to 3, the C-clamp of the prior art has its balancing, docking and relief module 11 consisting of a cassette 11a for guiding in translation, docking and balancing with springs, and a relief actuator 11b, which is a simple-effect actuator, generally pneumatic or hydraulic.

The cassette 11a comprises a rigid rectangular body 22, in each of the two large opposite sides of which is provided one, respectively, of two identical recesses, through each of which, one, respectively, of two identical guide columns 23 pass through longitudinally, which columns are spaced apart, parallel to one another and to the large sides of the body 22, attached to the body 22 by their two ends, and mounded so as to slide each into one, respectively, of two identical slides or tubular sleeves 24, parallel and secured to the frame 10, while the body 22 is rigidly attached under the body 5 of the welding actuator 4.

The two opposite axial end portions of each column 23, which extend from each side of the corresponding sleeve 24, are each surrounded by one, respectively, of two identical and opposing helical springs 25, coming into contact by an axial end with the body 22, at the corresponding end of the corresponding recess, and by the other axial end with the corresponding axial end of the corresponding sleeve 24. Thus, four balancing springs 25 come into contact with the sleeves 24 rigidly attached to the frame 10 in order to urge the body 22 of the cassette 11a, and therefore also the mobile subassembly rigidly connected thereto, axially on one side or the other, in order to balance the clamp, after the mobile subassembly (2, 3, 4, 8, 9) has been translated following the docking movement from the relief position (initial reference) of FIG. 1 to the balancing position of FIG. 2, by inverting the two positions of the fluidic control unit 26, interposed between the actuator 11b and a pressurized fluid supply line and a fluid return line.

Initially, the mobile subassembly has been brought to the relief position (FIG. 1), in which the stationary electrode 2 is separated from the sheet metal 1, by admission of pressurized fluid into the working chamber 27a delimited in the cylinder 27 of the actuator 11b by the piston 28, which is secured by the rod 29 of the cassette 11a body 22, until the piston 28 abuts the cylinder 27. This movement of the piston 28 and of the rod 29 causes the translation of the entire cassette 11a body 22 with the mobile subassembly (2, 3, 4, 8, 9) in the direction that compresses the springs 25 to the right of the sleeves 24 and relaxes the springs 25 to the left of the sleeves 24. The mobile subassembly is then rigidly attached to the frame 10 and the clamp is in the so-called relief, or reference position. The inversion of the distributor 26 controls the docking of the stationary electrode 2 against the sheet metal 1 by emptying of the working chamber 27a previously pressurized in the actuator 11b, due to the relaxation of the previously compressed springs 25, driving the translation in the opposite direction of the cassette 11a body 22 with the mobile subassembly (2, 3, 4, 8, 9), thus released from its stop, until the mobile subassembly and the cassette 11a body 22 are balanced between the two pairs of opposing springs 25 (see FIGS. 2 and 3).

The stroke of the docking operation is dependent on the stiffness and the tension of the springs 25, the mass and the tilt of the load to be balanced and possible friction that may slow the movement of the load. When the balancing position has been achieved, the mobile subassembly retains a certain axial flexibility, owing to the springs 25.

In this example, the cylinder 27 of the actuator 11b is rigidly attached, like the sleeves 24, to the frame 10, and the body 22 of the cassette 11a is rigidly attached to the mobile subassembly. Alternatively, the sleeves 24 can be secured to the mobile subassembly, and the cassette body 22 can be secured to the frame 10, in which case the rod 29 of the piston 28 of the actuator 11b drives the sleeves 24 passing through the body 22. Also alternatively, the cylinder 27 or the actuator 11b can be secured to that of the element(s), among the body 22 and the sleeves 24, which is (are) secured to the mobile subassembly, in which case the rod 29 of the piston 28 comes into contact with the other element(s) mentioned above, which is (are) secured to the frame 10, in order to move the mobile subassembly in translation with respect to the frame 10, against the action or under the action of the springs 25.

In these variants, as in the clamp of FIGS. 1 to 3, the mobile subassembly retains a certain axial flexibility, owing to the springs 25.

However, these realizations face a contradiction between, on the one hand, the need to balance, over a short course, a large tool mass, regardless of the orientation of the clamp, resulting in the need to use springs with high stiffness, and, on the other hand, the need for maximum flexibility of these same springs 25 in auto-balancing operations of the clamp on the sheet metal 1.

In practice, these realizations are fairly unsatisfactory, difficult to implement and are applicable only if the mass of the clamp is limited, and/or for sheet metal assemblies 1 of high thickness (the sheet metal assembly 1 with good rigidity) and/or for limited changes in the orientation of the clamp with respect to a vertical axis.

In a variant of the C-clamp, the cassette differs from that 11a of FIGS. 1 to 3 only by the absence of springs 25, so that it satisfies not the function of docking and resilient balancing, but only the function of guiding the mobile subassembly in translation with respect to the frame 10 owing to the columns 23 and the sleeve-slides 24. The docking and balancing function is then performed by the relief actuator 11b, which is a double-effect pneumatic cylinder, in which the cylinder 27 is secured to the frame 10 and the rod 29 of the piston 28 is secured to the cassette body 22, itself secured to the body 5 of the welding actuator 4. The pneumatic control is provided by the two-position distributor 26 cooperating with a control valve (not shown) enabling the control or blocking of the supply or emptying of compressed air to or from one 27a of the two working chambers of the actuator 11b, which compressed air is emptied from the other working chamber or supplied to this other chamber through the distributor 26.

In a first phase, the chamber 27a of the cylinder 11b is supplied, while the other chamber is emptied through the distributor 26 so as to push the piston 28 so that it abuts the cylinder 27, and, therefore, by the rod 29, the mobile subassembly in the relief position (reference position abutting the frame 10) so that said mobile subassembly is then rigidly connected to the frame 10, with the stationary electrode 2 being separated from the sheet metal 1. The control valve makes it possible to isolate the pneumatic actuator 11*b* in this position, in order to hold the clamp in this relief position.

Then, the docking and balancing operations are performed by controlling the inversion of the distributor 26 so as to re-pressurize the other chamber and by controlling, by means of the valve, the pressure difference between the two chambers of the cylinder 11*b*, so as to move the piston 28 and the rod 29, and therefore the mobile subassembly, so as to bring the stationary electrode 2 in contact with the sheet metal 1 (docking) and to compensate for the effect of the mass of the load (balancing).

Owing to the control of the pressure difference between the chambers of the cylinder, and the surface area difference between the two opposite faces of the piston 28 associated with the presence of the rod 29, the clamp is finely balanced over the entire stroke necessary for the docking operation. By using, as the distributor 26 and control valve, at least one proportional control regulator, the balancing operation can be performed for all of the orientations of the clamp in space as the welding process is implemented.

The docking, balancing and relief are therefore pneumatic in this variant of the C-clamp.

In this last variant, the two pressurized gas chambers on each side of the piston 28 rigidly connected by the rod 29 to the cassette body 22, and therefore to the mobile subassembly create the two resilient opposing balancing means.

However, in practice, this principle of pneumatic balancing docking and relief has the disadvantage of requiring pneumatic energy to be provided on the clamp. This is costly, very specifically when the main actuator 4 driving the mobile arm 8 is electric. Indeed in this case, the relied docking and balancing functions are the only functions requiring compressed air.

In addition, the numerous constraints of the process and associated with the products to be produced do not enable a single solution to be proposed that is compatible with the needs of different users. In conclusion, the pneumatic realizations, while capable of being high-performing, are not entirely satisfactory.

Similarly, the X-clamp of FIG. 4 enjoys a spring balance with the guide cassette 21*a* of the module 21, also performing the docking function, while the relief function is provided by the pneumatic or hydraulic single-effect cylinder-type actuator 21*b*, while, alternatively, it is possible for the balancing module 21 to include not a guide cassette 21*a*, but only a pneumatic double-effect cylinder-type actuator 21*b*, performing the functions of docking, balancing and relief of the clamp.

More specifically, in FIG. 4, the guide and balancing cassette 21*a* includes a piston 31 secured to a rod 32 mounted on the arm support 12 so as to pivot around a pin parallel to the rotation pin 13, and the piston 31 is mounted in a sliding way in a cylinder 33, which is pivotally mounted by its end opposite that through which the rod 32 passes, on the rigid console 17 of the frame 10, around a pin also parallel to the rotation pin 13, in which the cylinder 33 houses two helical and opposing springs 34 each in contact with one of the ends of the cylinder 33, on one side and on the other, against one, respectively, of the two opposite faces of the piston 31. Thus, the springs 34 provide the balance of the mobile subassembly in rotation around the pin 13 with respect to the frame 10, Linder the same conditions as the springs 25 of the C-clamp of FIGS. 1 to 3, and with the same disadvantages resulting from the need to have springs that are both flexible and significantly stiff, which is contradictory.

In the single-effect linear actuator 21*b* of the X-clamp of FIG. 4, the cylinder 35 and the rod 36 are pivotally mounted, by their opposite ends, respectively, on the rigid console 17 of the frame 10 and on the arm support 12, around pins parallel to pin 13, and, the piston 37 secured to the rod 36 delimits, in the cylinder 35, a working chamber 35*a* (on the side of the rod 36), which selectively communicates, by the same fluidic distributor 26 with two positions of FIGS. 1 to 3, with a pressurized fluid supply or a return line for said fluid, in which the supply of pressurized fluid to this working chamber 35*a* enables the piston 37 to be moved so as to abut the pivotally mounted portion of the cylinder 35, thereby causing the arm support 12, and therefore the mobile subassembly supported by the latter, to pivot in rotation around the pin 13 in order to bring and hold this mobile subassembly in the relief position (initial reference position) in which the stationary electrode 2 is separated from the sheet metal 1, while inside the cassette 21*a*, the piston 31 is drawn toward the outside of the cylinder 33 (on the side of the rod 32), thus compressing one of the springs 34 and relaxing the other. By controlling the inversion of the control distributor 26, the working chamber 35*a* of the actuator 21*b* is depressurized owing to the communication with an exhaust outlet 26*a*. Under the action of the balancing springs 34, the piston 31 returns to a balancing position inside the cassette 21*a* by causing the arm support 12 to pivot with respect to the rigid console 17 of the frame 10, which pivoting of the arm support 12 simultaneously exerts a pulling force on the rod 36 of the actuator 21*b*, of which the piston 37 is moved in the direction tending to reduce the volume of the working chamber 35*a*, and so that the stationary, electrode 2 at the end of the stationary arm 3 connected to the support arm 12 comes into contact with the sheet metal 1, in the docking and balancing position.

Alternatively, the pneumatic balancing of the clamp can be performed by the actuator 21*b*, which is then, as already mentioned, a double-effect pneumatic cylinder, controlled by the distributor 26 and a control valve (not shown) used under the same conditions to perform the pneumatic balancing of the pneumatic variant of the C-clamp mentioned above. Indeed, by controlling the distributor 26, the other chamber of the actuator 21*b* is connected to an exhaust outlet and therefore depressurized. The piston 37 then abuts the pivoting end of the cylinder 35, thereby enabling the clamp to be held in this relief position.

Then, the docking and balancing operations are performed by controlling the inversion of the distributor 26 so as to re-pressurize the other chamber and by controlling, owing to the valve, the pressure difference between the two working chambers of the cylinder, so as to compensate for the torque around the rotation pin 13 created by the mass and the position of the center of gravity of the mobile subassembly, and, as in the aforementioned variant of the C-clamp, at least one proportional control regulator is preferably used so that the balancing operation can be performed with the same flexibility for all of the orientations of the clamp in space, during the welding process.

However, this X-clamp variant with pneumatic relief, docking and balancing has the same disadvantages as the analogous pneumatic C-clamp variant, associated with the need to provide pneumatic energy to the tool.

Another solution consists of entirely eliminating, on the clamp, the degree of freedom associated with this balancing function. Indeed, it is possible to envisage a robot being informed, with sufficient precision, about the change in geometry of the tool, associated with the wear of the electrodes and with the drift of the point of contact between the electrodes when applying stress.

By knowing these values, the uncertainty on the relative positioning of the sheet metal 1 is reduced, and the robot can itself perform the docking, and then the balancing operation of the clamp on the sheet metal assembly 1.

This solution has the benefit of being economical, owing to the elimination of the degree of freedom on the clamp body, and of being operational independently of the orientation of the clamp in space.

However, this solution involves:
knowing precisely, and owing to regular tests, the degree of wear of the stationary electrode 2,
knowing the drift of the point of contact between the electrodes 2 and 9, when applying the load,
using a feedback controlled cylinder 4 (generally electric) enabling the deformation of the clamp to be monitored when the force is increased, and
using a robot specifically programmed to enable the clamp position to be corrected in a manner synchronized with the wear and deformation of the clamp.

The balancing operation is not flexible and can be performed only by using, as a set point, the theoretical position of the sheet metal 1, as error of positioning thereof cannot be taken into account, with the consequence of either a deformation of the sheet metal 1, or an imbalance in force, detrimentally affecting the quality of the welding process.

Finally, the times necessary for the robot to correct its path are relatively long, and lead to a cycle time loss with respect to the traditional realizations mentioned above.

SUMMARY OF THE DISCLOSURE

For these reasons, the invention is intended to propose a clamp for gripping sheet metal, used in association with a manipulating arm, and enabling docking, balancing and relief functions (return and holding of the clamp in the reference position) to be offered by uniquely electromechanical means, autonomously, without adjustment, and for all orientations of the tool in space.

Thus, the invention proposes a clamp of the type defined above, characterized in that:
said balancing system also includes at least one actuator, with a balancing operation, capable of bringing the mobile subassembly to a balancing position with respect to the support. Advantageously, the balancing actuator includes a reversible electric motor. In addition, the balancing system is advantageously also capable of locking said mobile subassembly in a position with respect to the support, and in particular of bringing the mobile subassembly into a so-called relief, or stationary reference position, with respect to said support.

The balancing module also preferably includes at least one position detector, capable of detecting the movement in said balancing system of the load formed by said mobile subassembly and members that are secured thereto in movement with respect to the support.

A position detector is preferably also capable of controlling the balancing actuator in order to bring the load into its balanced position.

In a first embodiment, said at least one position detector is a continuous position sensor, including at least one element secured to said support and connected to an electronic control circuit of said balancing actuator, and cooperating with a second element, secured to said mobile subassembly in its movements.

The clamp can be such that the additional degree of freedom is a translation movement of the mobile subassembly, in which case said balancing module is an electromechanical module, in which said member urged by said flexible device is a nut of a screw-nut system of which the screw, which extends parallel to the direction of said translation movement, is driven in rotation by said balancing actuator.

In this case, the position detector is advantageously also capable of controlling the motor in order to drive the screw in rotation in a direction that moves the nut so as to compensate for said movement of the load.

The advantage of this realization is that the compensation, by the electric motor and the screw-nut system, of the movement of the load to be balanced in the balancing system enables the load to be repositioned in a theoretical position of the sheet metal assembly, on the basis of information transmitted by the position detector to the motor, via a control circuit of the latter. In addition, the flexible device includes at least one balancing spring that extends substantially parallel to the direction of the translation movement. This node of action take-s place entirely autonomously, without adjustment and regardless of the orientation of the clamp in space, and up to a certain mass of the tool, which is dependent on the stiffness and the length of the spring(s) chosen.

According to a first embodiment, the balancing actuator operates as a relief actuator and is capable of being driven in rotation so as to push away, by the screw-nut system, said load to be balanced until bringing a stop secured to said balancing system against a relief end-of-stroke stop, associated with said support.

In order to secure the position of the load, the balancing actuator is advantageously capable of continuing the driving of the screw-nut system after bringing a stop of said balancing system into contact with a relief end-of-stroke stop, until the nut is brought into contact with a rigid element inside said balancing system.

Said rigid element inside the cassette can consist of one of the opposing springs, which is advantageously a helical spring then compressed with its turns substantially joined to one another, but, preferably, said rigid internal element is a stop of the nut in translation on the screw, and intended to limit the compression as well as optionally the pulling force on at least one balancing spring.

The docking operation is performed by controlling the rotation of the motor in the direction opposite that of the relief operation, in which the movement of the nut of the screw-nut system releases the load and re-balances it inside the balancing system. The rotation of the motor is continued until the position detector indicates that the mobile subassembly has returned to the position corresponding to the theoretical contact between the end of the stationary arm, arranged with the stationary electrode in the case of a welding clamp, and the sheet metal assembly.

Thus, said continuous position sensor can advantageously be a linear position sensor, including at least one rod extending substantially parallel to the screw, and secured to said balancing actuator, in which said rod is connected to an electronic control circuit of the motor, and cooperates with an element secured to said balancing system in its movements in the direction of said screw and said translation movement.

However, to reduce the risk of oscillation of the load in the balancing system, it is advantageous to replace the continuous position sensor with a position detector that includes an end-of-stroke sensor, of the electrical contact position sensor type, integrated in or associated with a relief stop and detecting the presence or absence, against said end-of-stroke sensor, of a mobile contact integrated or associated with a stop of said balancing system, and another coder-type position sensor, associated with said motor in order to control a rotation of the motor positioning said stop at a predetermined distance "d" from the relief position.

Thus, the end-of-stroke sensor can indicate that the load has left the relief stop and is therefore balanced in the balancing system. The coder associated with the motor then enables the nut to be positioned at the distance "d" to be observed, this solution however being valid only if the orientation of the clamp is not modified during the balancing phase. However, this is often the case, in practice, in resistance welding applications.

To optimize the performance of the functions of returning to and in particular maintaining the relief position, the clamp according to the invention can advantageously comprise auxiliary means and in particular gripping means, capable of attaching said mobile subassembly and the balancing system in the relief position, stationary with respect to said support.

According to alternative embodiments, said gripping means can be arranged as releasable attachment means combined with said relief end-o stroke stop, in order to attach against the latter the stop of said balancing system, so as to maintain the mobile subassembly in the relief position. These releasable attachment means can be produced in the form of an electromagnet, or a pneumatic or electromagnetic suction, alone or in combination with a mechanical gripping system.

In another embodiment, the clamp includes, optionally in addition, a pusher, which is a relief actuator produced in the form of an auxiliary linear actuator, distinct from the balancing actuator, and in a direction of action substantially parallel to the screw of the screw-nut system, and capable of urging said balancing system with said mobile subassembly in order to move it until a stop of said balancing system comes into contact with a relief end-of-stroke stop, thus enabling the balancing system and the mobile subassembly to be brought and held rigidly in the relief position, without needing to drive the electric motor of the balancing actuator.

In other words, the gripping means and/or the relief actuator mentioned above can perform the function of holding the mobile subassembly in the relief position once said mobile subassembly and the balancing system come into contact with the relief end-of-stroke stop, whereas a relief actuator distinct from the balancing actuator can perform the functions of returning and holding the mobile subassembly in the relief position from a balancing position.

The advantage of including an auxiliary relief actuator, if a plurality of welding points is to be produced in succession without modifying the tilt of the clamp, is that the nut of the screw-nut system is already pre-positioned in its balancing position for the welding points that follow the first point.

In addition, such auxiliary assistance means provide numerous other advantages, in particular limiting the stroke covered by the nut of the screw-nut system, and therefore reducing the response time of the system, the wear of the system as well as limiting the amplitude and frequency of the alternating compression and decompression movements of the springs of the balancing system, thereby limiting the fatigue stress of the system, and, consequently, reducing the nominal power and the maximum power necessary for the electric motor of the balancing actuator, with an improvement in its production cost, and, finally, the use of a brake associated with the electric motor of the balancing actuator is made unnecessary by the presence of the aforementioned gripping means.

In a simple embodiment, the linear actuator is a single-effect actuator with resilient return, and preferably attached to the balancing actuator.

According to another embodiment, the movement of the main actuator of the clamp is used to perform the functions of returning and holding the mobile subassembly comprising said main actuator in the relief position. In this case, the relief actuator is therefore formed by said main actuator of the mobile subassembly. In an example of an embodiment, the rod of said main actuator has a longitudinal recess delimited at one end by a ramp forming a cam for a head at one end of a pin mounted so as to slide transversely into a bore of a main actuator body, and of which the other end is arranged as a V-shaped end piece capable of being transversally engaged in a V-shaped recess provided in an external face of said balancing system mounted so as to be capable of moving in translation with respect to a support of the stationary arm and for guiding the mobile arm, so that the retraction of the rod of the main actuator into the body of the latter causes a radial movement of the pin toward the outside of the actuator body and into the V-shaped recess of said balancing system, causing, by cooperation of the V-shaped end piece of said pin and a ramp of the V-shaped recess of said system, the translation movement of the latter until it reaches a relief end-of-stroke stop position.

In the various embodiments, the motor of the balancing actuator is advantageously controlled by an electronic control circuit arranged in a board directly integrated in the motor, or in said balancing system, and is optionally equipped with a safety brake, and an output reducer.

When the clamp is in a configuration requiring the intervention of the safety brake, the motor advantageously comprises a torque limiter and/or a position sensor that, after detecting that a stop of the balancing system has come into contact with a relief end-of-stroke stop, then after detecting that said nut is abutting the limit stop of the nut stroke, cuts the electrical supply to the motor and activates the application of said safety brake, so as to lock the motor in its position, and thus effectively protect it from a risk of overheating.

When the device enabling a movement according to the additional degree of freedom is a translation guide device, it is advantageous for the translation guide device to comprise at least one column, parallel to the translation direction and secured in movement to one of said mobile subassembly and said support, in which said at least one column is mounted so as to slide axially into at least one sleeve secured to the other of said support and said mobile subassembly.

In addition, the guide device is advantageously integrated in said balancing system, and includes two columns parallel to the screw, on each side of the latter, and attached in said balancing system, so as to slide each into one of the two parallel sleeves.

It is understood that it is thus possible to produce an electromechanical balancing module with numerous advantages, in particular the absence of a need for compressed air, which is operational regardless of the orientation of the clamp in space, which includes a spring balancing cassette of which the sizing makes it possible, in an acceptable casing, to preserve good flexibility of the balancing function for large clamp masses, thereby indirectly enabling a larger number of components to be balanced, with the mobile subassembly, in particular enabling a welding transformer to be integrated in the mobile subassembly. In addition, it is possible to apply, in a clamp according to the invention, the teachings of the patent application FR 06 04384 of the applicant, so that the balancing module is offset to the outside of the assembly formed by said mobile subassembly and said frame. This makes it possible to largely simplify the clamp, to propose the balancing function as all option, without affecting the price of the basic tool for all applications for which this function is not desired or is not necessary, and to preserve standard robots without path compensation associated with the drift of the welding point or cycle time loss.

Thus, the balancing module can be mounted as an interface between two support parts, of which a first part is secured to said frame and/or said mobile subassembly, and the second part forms the rest of the support or is secured to the rest of the support.

However, advantageously, said balancing module is mounted as an interface between said support and said frame and/or said mobile subassembly.

In particular, said balancing module can be attached on a side of the body of the main actuator and/or said frame supporting said mobile subassembly.

According to the invention, the balancing module can be placed on a C-type clamp, with linear movement of the mobile arm with respect to the stationary arm, so that the translation movements allowed by said balancing module are substantially parallel to the movements of the mobile arm, and therefore substantially perpendicular to the plane of the sheet metal assembly.

However, the balancing module can, according to the invention, also be placed on an X-type clamp, with a rotation movement of the mobile arm with respect to the stationary arm, so that the translation movements allowed by said balancing module are substantially perpendicular to the plane of the sheet metal assembly, and therefore substantially parallel to the direction of the two arm ends, end-to-end when the clamp is in the closed position.

In a preferred embodiment, said balancing module is capable of being mounted on said frame, in one or the other of at least two positions allowing translation movements substantially parallel to one or the other, respectively, of at least two directions inclined with respect to one another, and preferably substantially perpendicular to one another, in the plane of an assembly face on the frame, depending on whether the clamp is of the C type or of the X type, respectively with translation or rotation movements of the mobile arm with respect to the stationary arm.

BRIEF DESCRIPTION OF THE DRAWINGS

Other features and advantages of the invention will become clear from the following description, provided for non-limiting purposes, of examples of embodiments described in reference to the appended drawings, in which.

DETAILED DESCRIPTION OF THE DISCLOSURE

Figure 1:
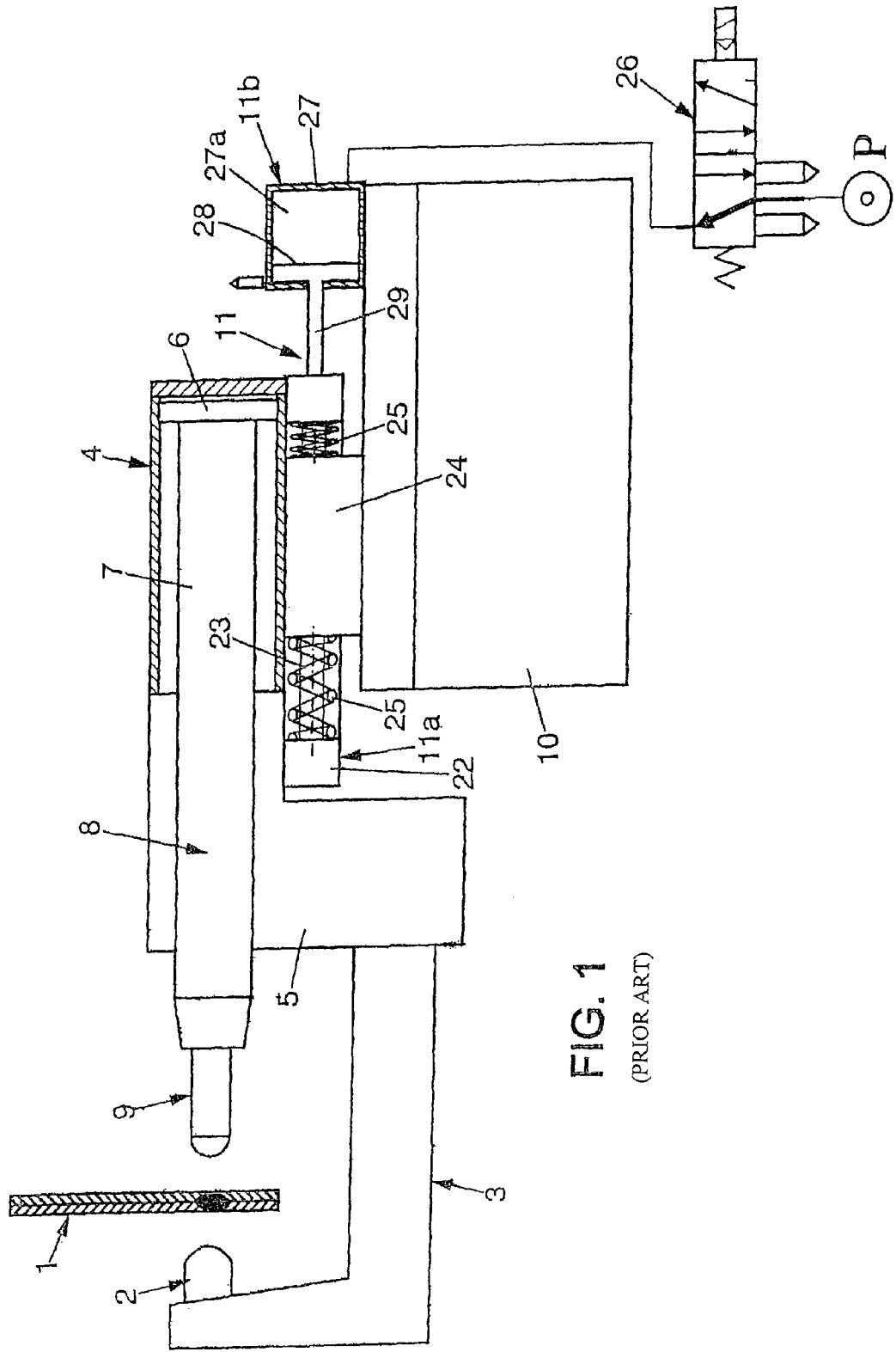
FIG. 1 is a diagrammatic partial axial cross-section and partial lateral elevation view of a C-clamp of the prior art with a spring balancing module, in the relief position.
Figure 2:
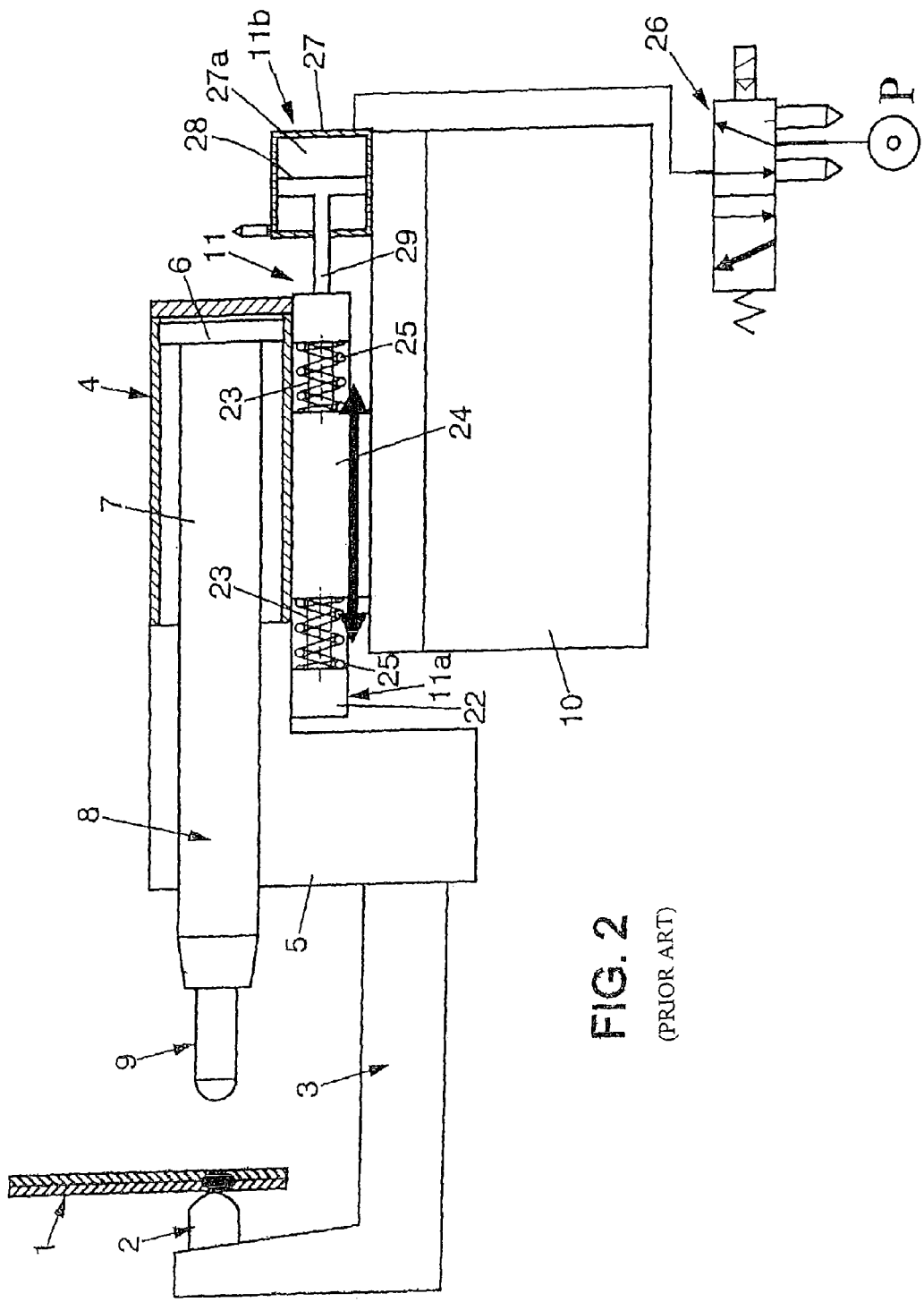
FIG. 2 is a view similar to that of FIG. 11 showing the C-clamp in the docking/balancing position.
Figure 3:
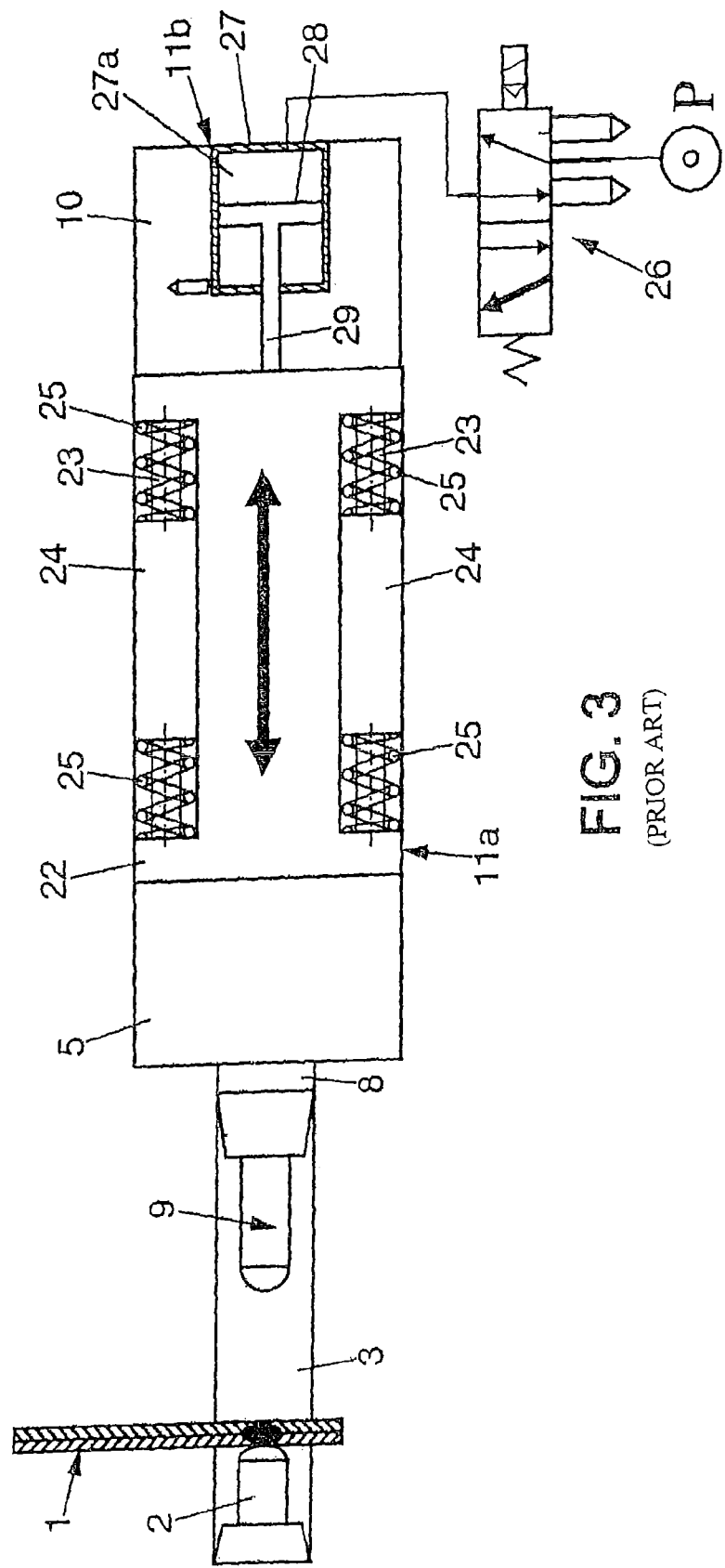
FIG. 3 is a diagrammatic partial plan and partial horizontal cross-section view of the C-clamp in the same position as in FIG. 2.

According to the invention, as shown in FIGS. 5 to 26 and described below, the C-clamps, like the X-clamps, having the same basic frame and functioning according to the same principles as analogous clamps of the prior art, are also equipped with a module or balancing, docking and preferably also relief, of a structure specific to the invention, but for implementing the same basic principles as analogous modules of the prior art. For this reason, in FIGS. 5 to 26, the same numeric references are used to designate identical or equivalent components of the clamps of the invention as those of the prior art, and the balancing, docking and relief modules of the invention as those of the prior art. However, the clamps equipped with such modules according to the invention differ from the clamps equipped with such modules according to the prior art essentially by the structure of the modules, which, optionally, can have a position different from the conventional position, and be offset outside the actual clamp, namely the assembly formed by the mobile subassembly of each clamp and the corresponding frame, in accordance with the teachings of the patent application FR 0604389 of the applicant.

FIGS. 5 to 16 show a first example of a clamp according to the invention, which is a clamp for resistance welding of a sheet metal assembly 1 between the welding electrodes 2 and 9, a the end, respectively of a stationary 3 and a mobile 8 arm, respectively supported and guided by a support secured to the body 5 of the main actuator 4 or welding cylinder, of which the piston 6 is secured to the rod 7 extended by the mobile arm 8, in which these elements form a mobile subassembly or cart, connected to the frame 10 of the clamp, to which the welding transformer 41 is integrated for example attached on the wrist of a robot arranged as a manipulating arm, by means of a balancing module 51 allowing, between the aforementioned subassembly, or any assembly including it, and the frame 10, the transformer 41 and their common support, a degree of freedom in translation parallel to the translation direction of the mobile arm 8 maneuvered by the actuator 4.

This balancing module 51, intended to balance the forces exerted on the ends, in this case the electrodes 2 and 9, of the stationary 3 and mobile 8 arms in the closed position, thus comprise a device or moving the body 5, and therefore the mobile subassembly, in translation with respect to the frame 10, and therefore with respect to the support of the latter, as well as a balancing system including a flexible device and a balancing actuator, in which the flexible device is also connected to the body 5, and therefore to the mobile subassembly, and includes at least one balancing spring, such as a helical spring 25, extending substantially parallel to the translation direction of the movement device and urging, in this direction, a member connected to the frame 10, and therefore its support, while the balancing actuator, also connected to the frame 10, maneuvers said member urged by the spring(s) of the flexible device so as to bring the body 5, and therefore the mobile subassembly, into a balancing position with respect to the frame 10, and therefore with respect to its support.

Figure 5:
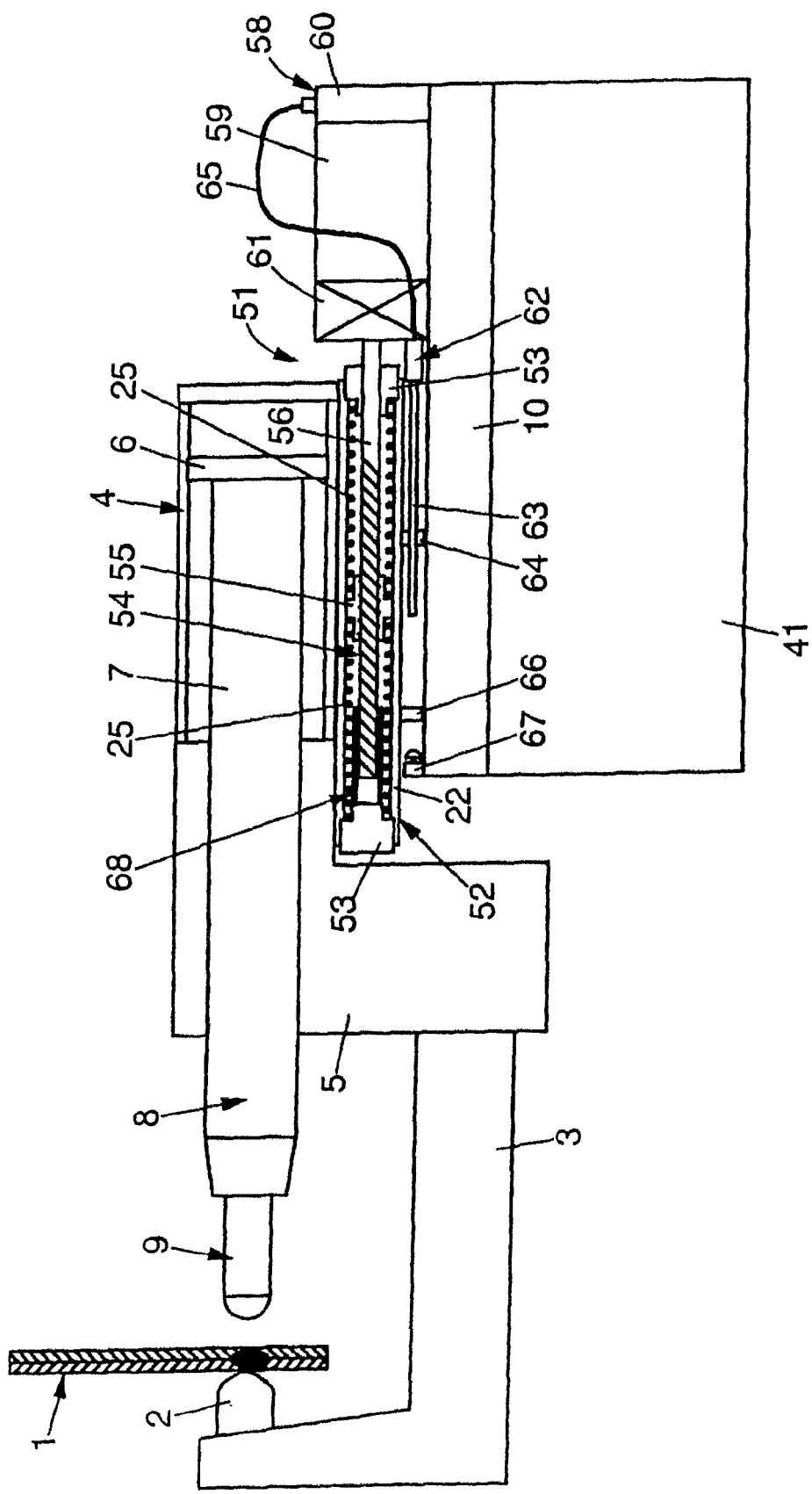
FIG. 5 is a view similar to that of FIG. 2 of a C-clamp with a balancing module according to the invention, with a linear position sensor, in a position close to balanced and in the process of closing or opening the clamp.
Figure 6:
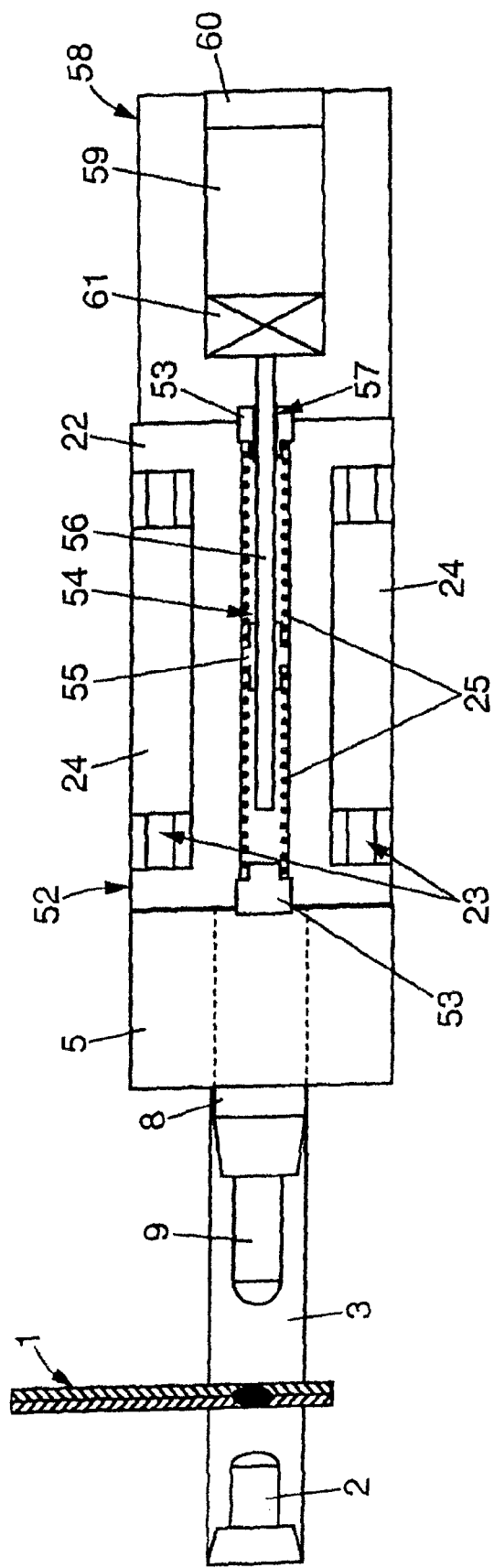
FIG. 6 is a view similar to that of FIG. 3 for the clamp according to the invention of FIG. 5.

In this example, the translation movement device and the flexible device are integrated with one another and produced in the form of a cassette 52 for guiding in translation and resilient balancing, in which the cassette 51 comprises, as shown in FIGS. 5 and 6, a cassette body 22, with a general parallelepiped shape, having two longitudinal recesses, in each of which is attached one, respectively, of two guide columns 23 parallel to one another and to the translation direction, on each side of a longitudinal and central passage housing two opposing balancing springs 25, pre-stressed in opposition, each coming into contact with one, respectively, of two pre-stressing nuts 53 of the balancing springs 25, in which each nut 53 closes one, respectively, of the longitudinal ends of the central passage of the cassette body 22, and the two springs 25 urge, in opposition, the nut 55 of a screw-nut system 54, of which the screw 56, of the ball screw or the trapezoidal threaded screw type, extends axially into the central passage of the body 22 and is screwed into the nut 55, by passing through one of the two pre-stressing nuts 53 by means of a bearing 57 (see FIG. 6) enabling the rotation and axial translation of the screw 56 in said nut 53, in which the cassette body 22 is secured in translation to the body 5 of the mobile subassembly and guided in this translation by the guide columns 23 mounted so as each to slide axially into one of the two guide sleeves 24 secured to the rigid frame 10.

The balancing system is completed by a balancing actuator 58, essentially including an electric motor 59, which is reversible and drives the screw 56 in rotation, in which the actuator 58 is secured to the base 10.

The balancing module 51 is thus an electromechanical module, associating the cassette 52 for guiding in translation and resilient balancing with the balancing actuator 58, of which the motor 59 is controlled by an electronic control circuit this control circuit can be arranged in an electronic board 60 directly integrated at the rear of the motor 59, optionally equipped with a safety brake, diagrammatically shown in 61, and/or an output reducer stage 61' (see FIGS. 17 to 20 described below) in order to drive the screw 56 in rotation. In addition, the motor 59 advantageously integrates a torque limiter or a position sensor, controlling the application of the safety brake so as to lock the motor 59 in its instantaneous position, and therefore also the screw-ant system 54, under circumstances specified below.

In addition, the balancing module 51 includes a position detector enabling detection of the movement, in the balancing system, of the load formed by the mobile subassembly (3, 4, 8) and all of the members optionally secured to it in movement with respect to the support, i.e. in this example, with respect to the frame 10, this position detector controls the balancing actuator 58, and more specifically the electronic control board 60 of the motor 59, so that the motor 59 is driven in rotation in the appropriate direction and the number of rotations suitable for bringing the load by longitudinal movement of the nut 55 of the screw-nut system 54 into its balanced position between the two springs 25.

In this example, the position detector is a continuous linear position sensor 62, including a rod 63 extending substantially parallel to the screw 56, in the free space between the body 22 of the cassette 52 and the frame 10, and projecting on the face of the actuator 58, which is facing the screw-nut system 54, and this rod 63 cooperates with an element 64 attached so as to project on an external face of the body 22 of the cassette 52, and therefore secured to the mobile subassembly (3, 4, 8) in its movements, in order to deliver a position signal to the electronic control board 60 of the motor 59 by the line 65 connecting the base of said sensor 62 to said board 60.

As an example, this position sensor 62 can be of the potentiometric type, in which case the element 64 secured to the cassette 52 is a marker sliding in contact alone the rod 63 in order to deliver a position signal to the control board 60 of the motor 59.

According to another example, this position sensor 62 can be of the magnetostrictive type, in which case the element 64 secured to the cassette 52 is a magnetic ring engaged around and sliding along the rod 63, in order to deliver a signal to the control board 60 of the motor 59.

A balancing module 51 is thus produced, in which the balancing system integrates a feedback controlled actuator 58, enabling action on the balancing springs 25 of the flexible device of this system, and correction of the position of the mobile subassembly (3, 4, 8) to be balanced, owing to the position sensor 62 also integrated in the balancing system and acting on the actuator 58 so as to enable the balancing system to function autonomously, regardless of the mass of the tool to be balanced and its orientation in space.

The balancing module 51 also comprises a stop 66 attached so as to project on an external face of the body 22 of the cassette 52, for example on the same side as the element 64 of the sensor 62, and a relief end-of-stroke stop 67, secured to the support by being, in this example, secured to the frame 10 and projecting on the latter so as to limit the translation stroke of the cassette 52 with the mobile subassembly (3, 4, 8), in the direction moving the stationary electrode away from the sheet metal assembly 1, by the contact of the stop 66 of the balancing cassette 52 against the relief end-of-stroke stop 67.

Thus, the balancing actuator 58 also performs the function of a relief actuator, because the motor 59 can be rotated so as to push away, by the screw-nut system 64, the load to be balanced with the mobile subassembly (3, 4, 8) and therefore also the body 22 of the cassette 52, until the stop 66 of the cassette 52 is brought against the relief end-of-stroke stop 67, attached to the frame 10, and therefore stationary with respect to the support of the clamp.

The operation of the C-clamp equipped with this balancing module 51, according to FIGS. 5 and 6, is described below in reference to FIGS. 7 to 16 starting from the clamp stopped in the relief position according to FIG. 7, in which the stationary 2 and mobile 9 electrodes are moved away from the stack of sheet metal 1 to be assembled, and outside of the area of uncertainty of the position of this stack, as shown with dotted lines on each side of the sheet metal 1, in which the guide and balancing cassette 52 is locked in its reference position by the contact of the stop 66 of the cassette 52 against the relief end-of-stroke stop 67 on the base 10, in which the nut 55 of the screw-nut system 64 has been moved along the screw 56 by the rotation of the motor 59 of the actuator 58 in the direction leading to contact of the two stops 66 and 67, then the driving of the screw-nut system 64 after this contacting of the stops 66 and 67 being continued until the nut 55 comes into contact with a stop 68S stopping the nut 55 in translation on the screw 56, and intended to limit the compression of the spring 25 located on the side of the stop 67 with respect, to the nut 55 (spring 25 compressed at the left in FIG. 5) and optionally to limit the pulling force of the other balancing spring 25 (between the nut 55 and the actuator 58 at the right in FIG. 5).

This stop 68 for stopping the nut in translation on the screw 56 is, in this example, a tubular stop, in which the end of the screw 56 is engaged without contact, on the side opposite the motor 59, and which is secured to the pre-stressing nut 53 of the balancing spring 25 on the side of the same axial end of the cassette 52. The stop 68 thus prevents the nut 55 from moving along the screw 56 to the point of compressing said helical spring 25 until its turns are joined, which can be damaging to the spring.

Figure 7:
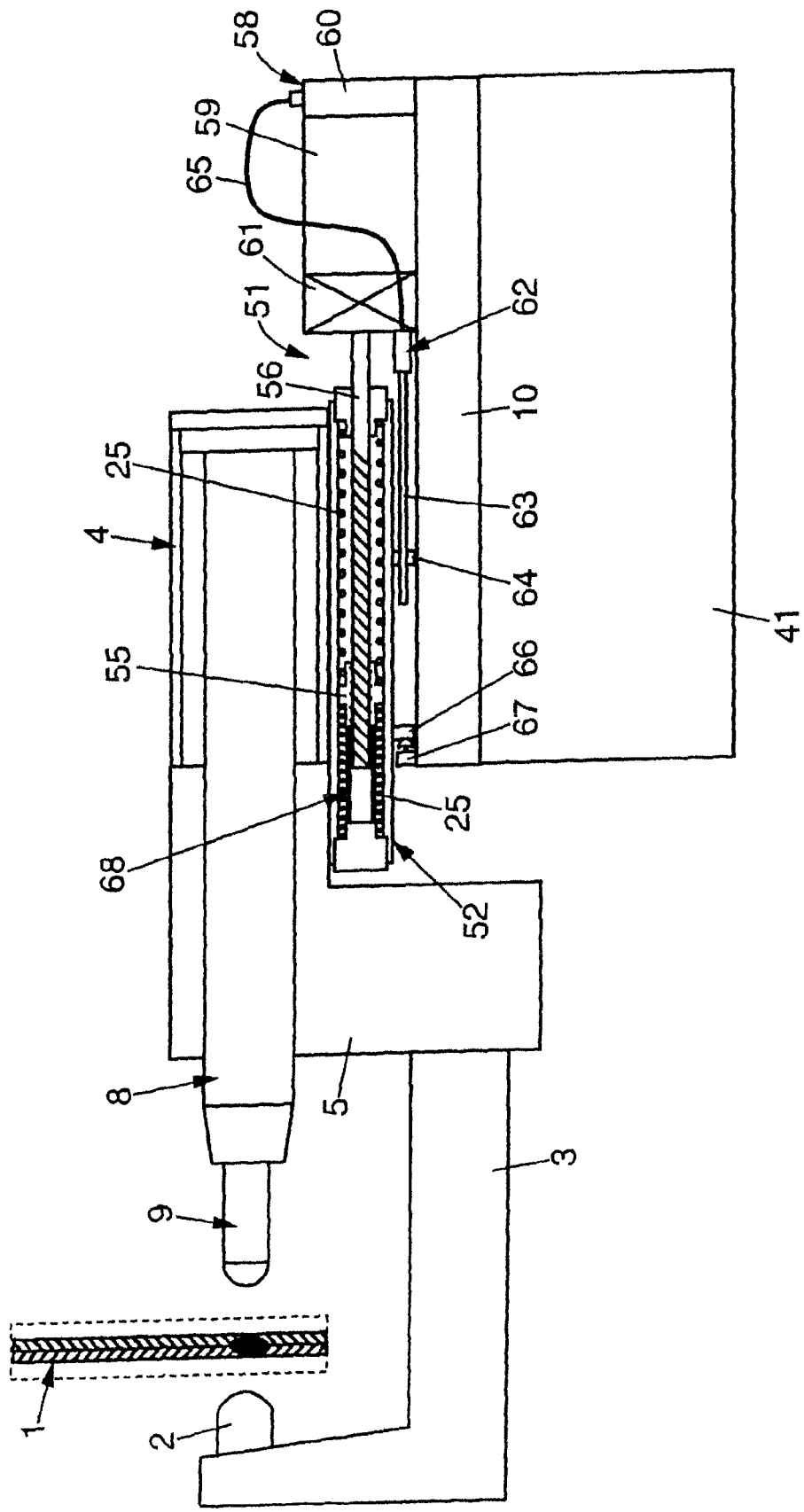
FIG. 7 is a view similar to that of FIG. 5 of the clamp in the relief position.
Figure 8:
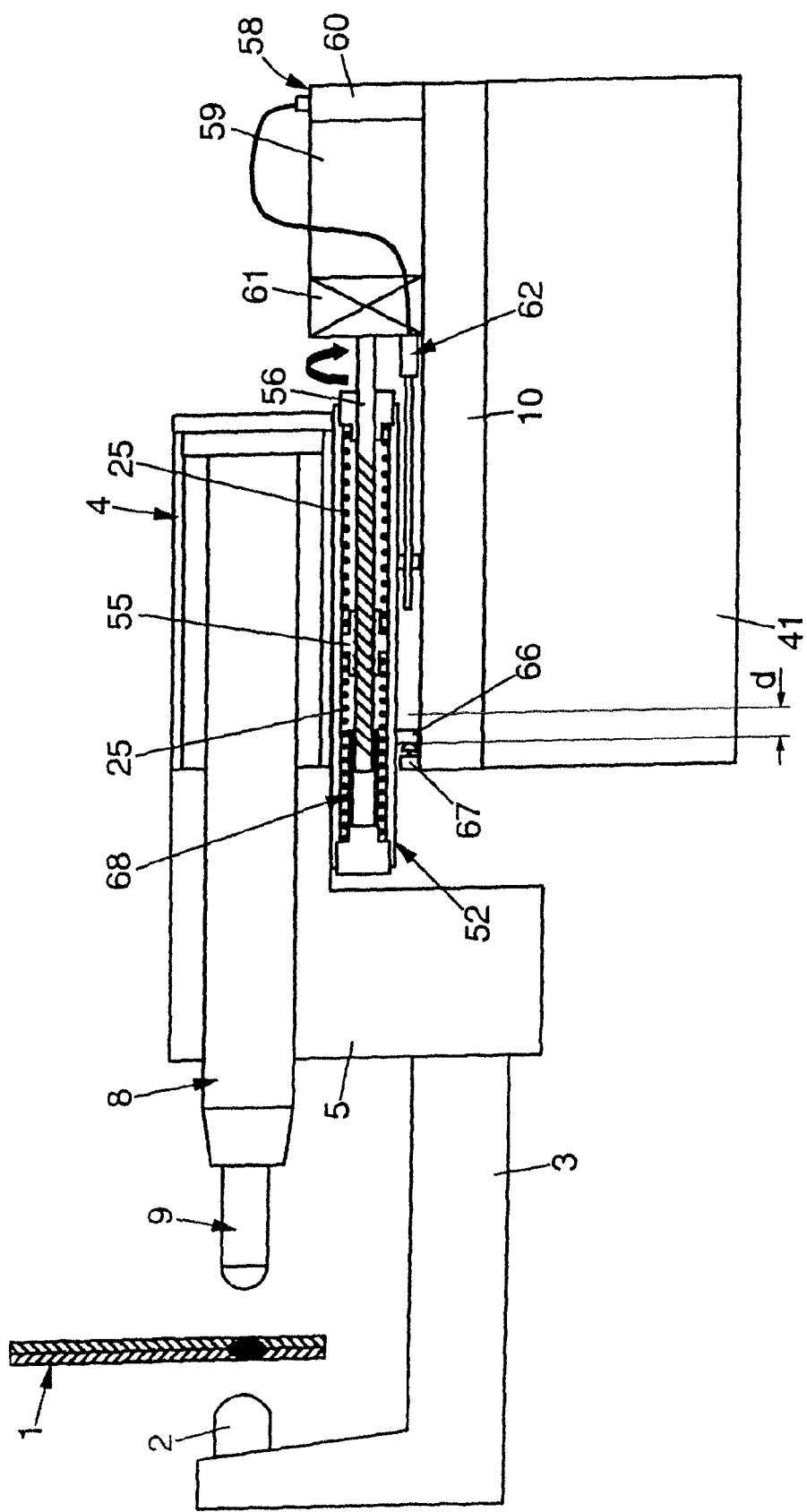
FIG. 8 is a view similar to that of FIG. 7 of the clamp during balancing, in an intermediate position between those of FIGS. 5 and 7.
Figure 9:
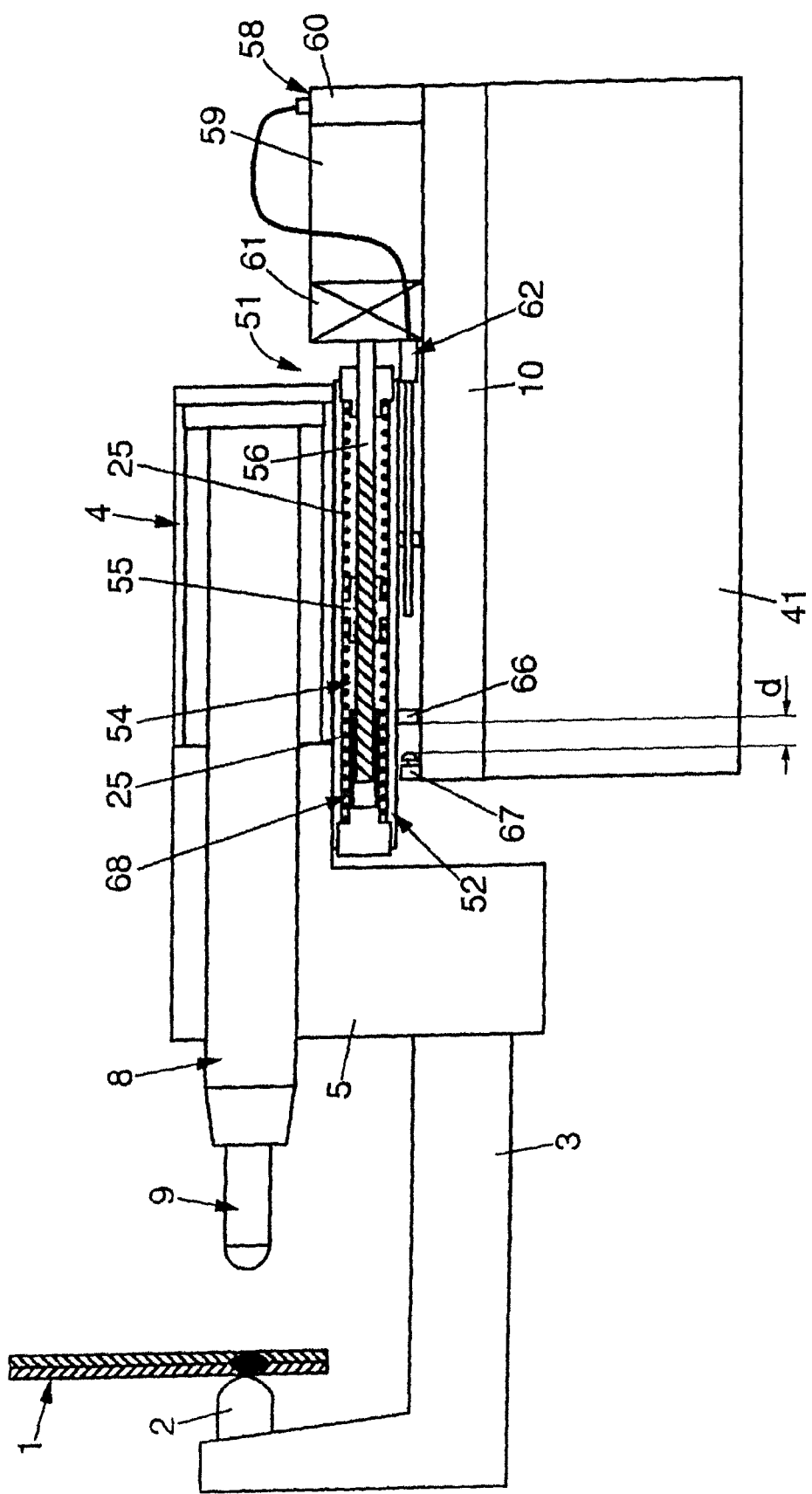
FIG. 9 is a view similar to that of FIG. 8 and showing the balancing position, but with the clamp open.
Figure 10:
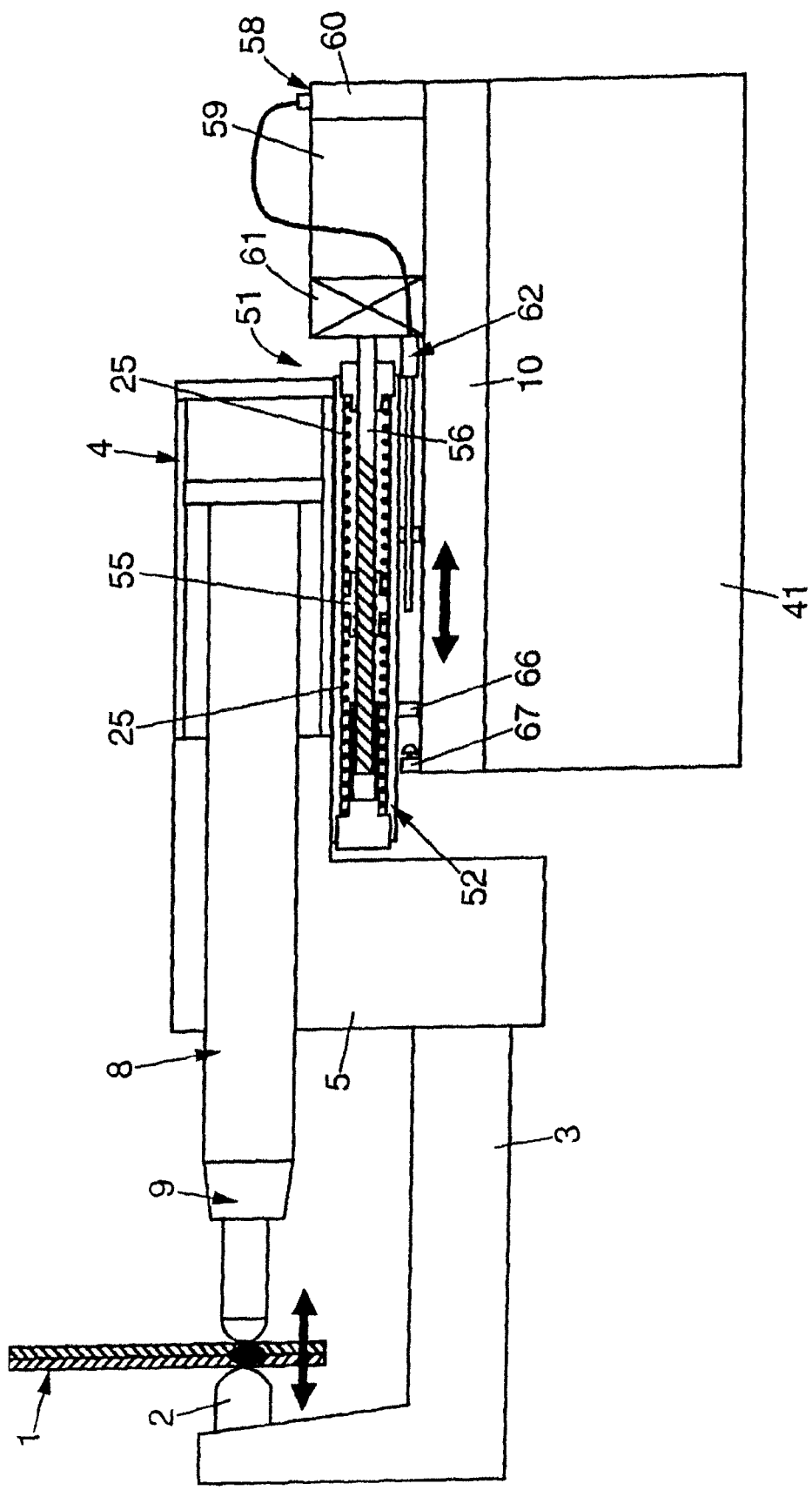
FIG. 10 is a view similar to that of FIG. 9, showing the balancing position, but with the clamp closed.

From the relief position of FIG. 7, the user gives the electronic board 60 an instruction so that the clamp reaches its balancing position, and the board 60 activates the rotation of the motor 59 and the screw-nut system 64 until the balancing position is reached, i.e. when a set distance "d" separates the relief stop 67 from the stop 66 of the balancing cassette 52. The screw 56 is driven in rotation by the motor 59 in the direction separating the nut 55 from the stop 68 and, in a first phase, this movement of the nut 55 enables the relaxation of the compressed spring 25, located on the side of the stop 68, and the compression of the other relaxed spring 25, located on the side of the actuator 58, without the stop 66 losing contact with the relief stop 67. This first phase ends when, owing to the rotation of the motor 59, the nut 55 of the screw-nut system 64 is returned to the balanced position of the cassette 52 under the action of the two opposing springs 25, in which the two stops 66 and 67 are still in contact with one another, as shown in FIG. 8, in which, in addition, the clamp is open, since the mobile arm 8 is maximally retracted into the body 5 of the main actuator 4. However, to save time, the closing or the clamp by moving the mobile arm 8 toward the sheet metal stack 1 owing to the main actuator 4 can be controlled while the balancing movement is taking place. Starting from the balancing position of FIG. 8, the continuation of the rotation of the motor 59 in the same direction causes the clamp to then move in translation, so that the stop 66 moves away from the relief stop 67. This translation movement is interrupted when the position sensor 62 indicates to tire electronic board 60 that the distance separating the stops 66 and 67 is equal to the set distance "d", which corresponds to the docking position of the stationary electrode 2 against the sheet metal stack 1, and the stopping of the motor 59 is controlled (see FIG. 9). In this FIG. 10, as diagrammatically indicated by the double arrows, the clamp is balanced in the cassette 52 with springs 25 and can therefore be adjusted with respect to the actual position of the sheet metal 1 without excessive stress thereon.

Figure 11:
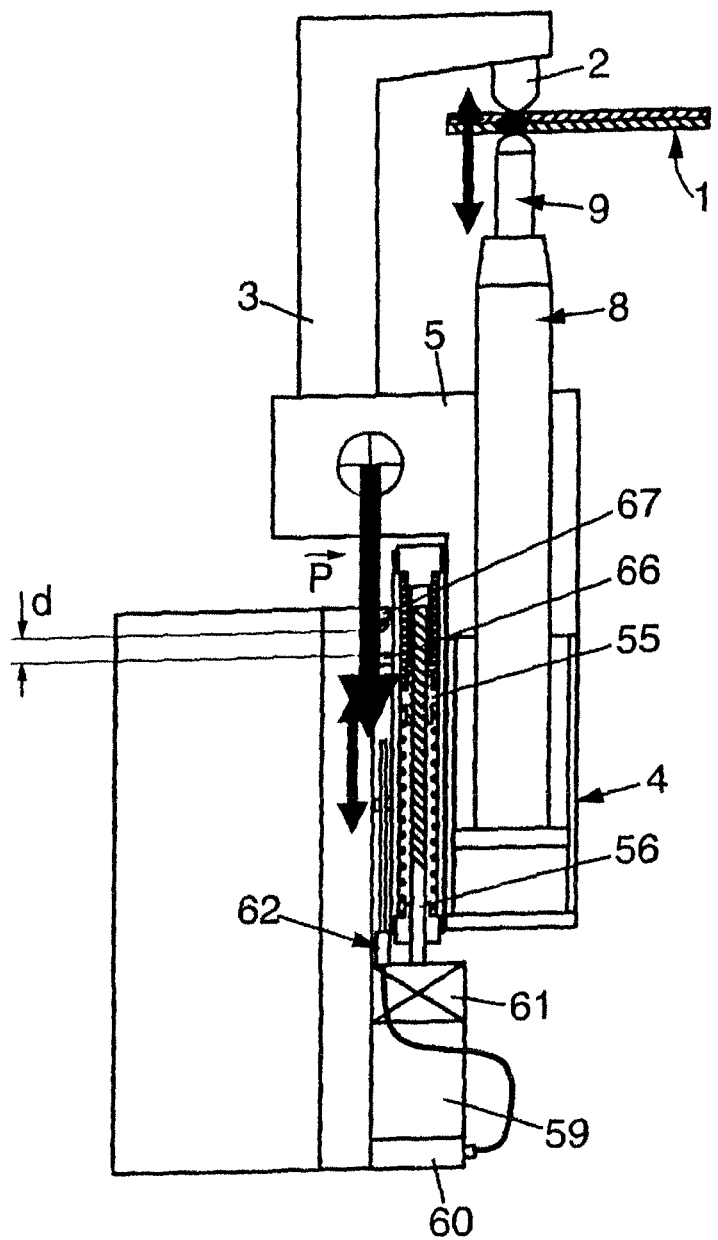
FIG. 11 is a view similar to that of FIG. 10, but in a vertical orientation of the clamp with the arms up.

If the clamp is arranged in the vertical position with the arms 3 and 8 directed upward, as shown in FIG. 11, the clamp, i.e. the mobile subassembly (3, 4, 8) moves under the effect of its own weight P with the cassette 52 with respect to the screw-nut system 54, thereby compressing the spring 25 in the upper position, and, due to the compression of said spring 25, the distance "d" between the stops 66 and 67 is no longer observed. From the new balanced position reached and detected by the position sensor 62, the motor 59 is automatically caused to rotate by the control board 60, and the screw-nut system 54 is driven so as to raise the clamp so that the distance "d" is observed. The rotation of the motor 59 thus enables compensation for the compression of one of the springs 25 under the influence of the tool weight, and the clamp is again balanced in the spring cassette 52. As the distance "d" is again reached, the rotation of the motor can be stopped. From this position, shown in FIG. 11, the tool can be adjusted with respect to the actual position of the sheet metal 1 without excessive stress thereon, as indicated by the double arrows in FIG. 11. In practice, the two movements, namely the compression of a spring 25 in the cassette 52 and the rotation of the motor 9, will be simultaneous, thereby enabling the distance "d" to substantially never be lost.

Figure 12:
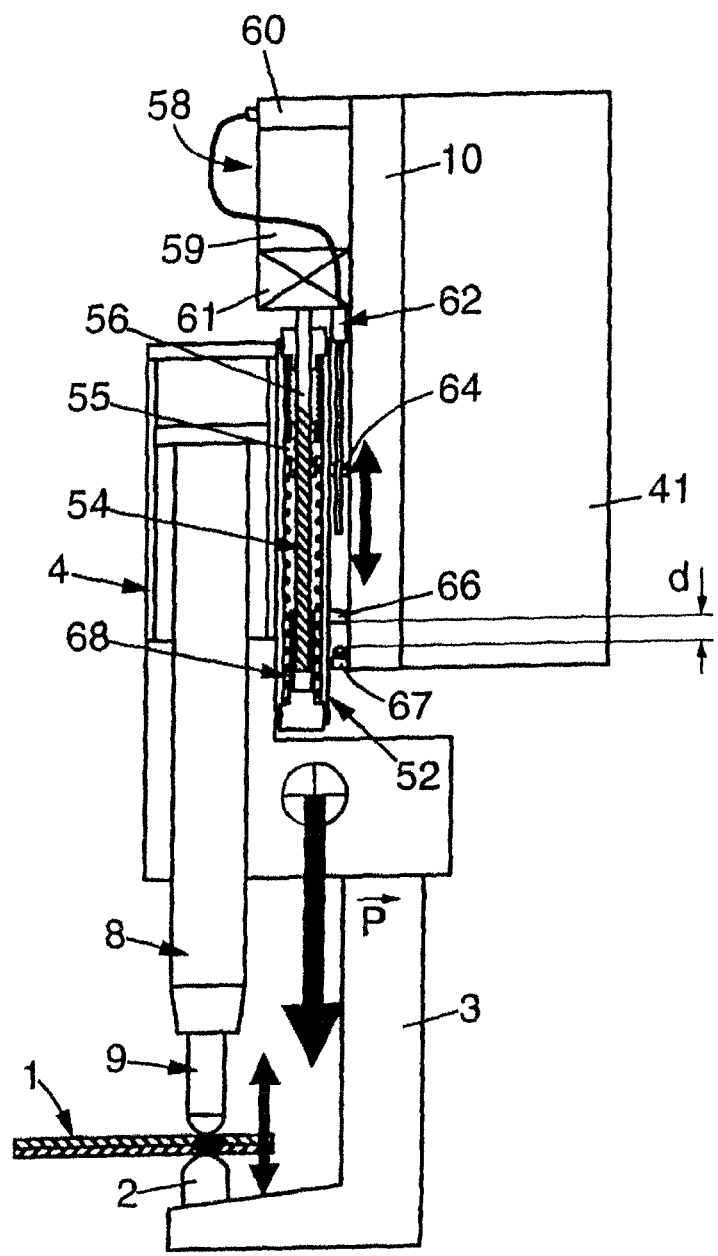
FIG. 12 is a view similar to that of FIG. 11, in a vertical orientation of the clamp but with the arms down.

Similarly, when, as shown in FIG. 12, the clamp is oriented in the vertical position, with the arms 3 and 9 turned downward, the clamp moves with the cassette 52 under the effect of their own weight P with respect to the screw-nut system 54, by compressing one of the two springs 25, and due to the compression of this spring 25, the distance "d" is no longer observed. Without action on the motor 59, a new balanced position is reached. From this new balanced position, the rotation of the motor 59 and the screw-nut system 54 enables the clamp to be raised so that the distance "d" is again observed. As in the case of FIG. 11, it is understood that, without compensation by the motor 59, the stationary electrode 2 would not be in contact with the sheet metal 1; thus, it would be deformed in the end of the closing phase of the clamp by the mobile arm 8. The rotation of the motor 59 therefore enables compensation for the compression of the spring 25 under the influence of the tool weight, again brought into balance in the cassette 52. As the distance "d" is again reached, the rotation of the motor 59 can be stopped. As indicated by the double arrows in FIG. 12, the mobile subassembly (3, 4, 8) again balanced in the cassette 52 can be adjusted with respect to the actual position of the sheet metal 1 without excessive stress thereon.

As in the case of FIG. 11, in practice, the two movements, namely the compression of a spring 25 in the cassette 52 and the rotation of the motor 59, will be simultaneous, thereby enabling the distance "d" to substantially never be lost.

It is understood that the principle, which consists of using the position sensor 62 to read the movement of the load to be balanced in the cassette 52 and to inform the motor 59, which, in rotation, will compensate by means of the screw-nut system 54 for this movement and reposition the load in a theoretical position of the sheet metal 1, works regardless of the orientation of the clamp in space, up to a certain mass of the mobile subassembly and the members secured thereto in movement, as a function of the stiffness and the length of the springs 25 chosen.

Figure 13:
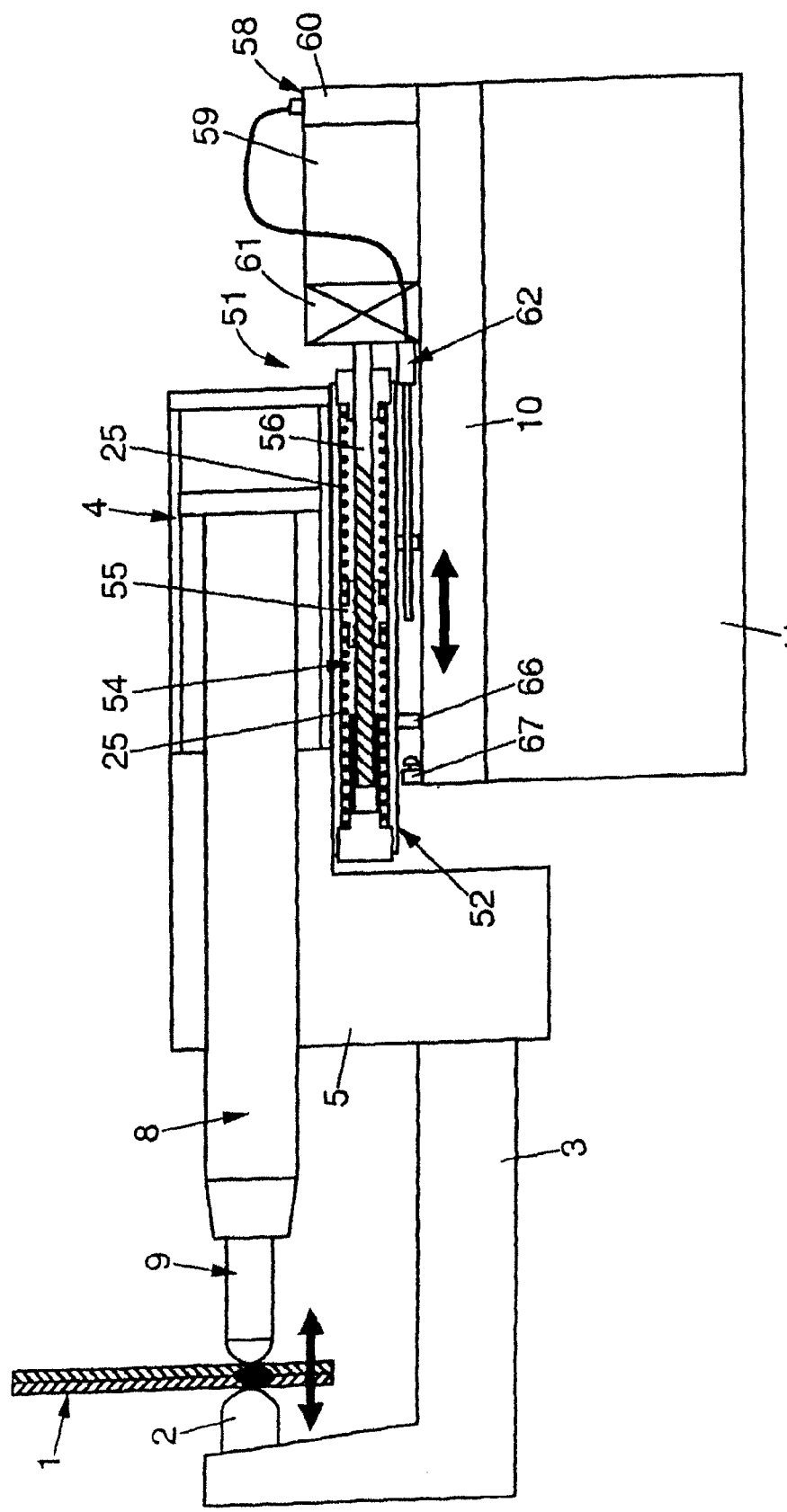
FIG. 13 is a view similar to that of FIG. 10 showing the clamp at the beginning of the return to the relief position, and to be considered independently of the orientation of the clamp in space.
Figure 14:
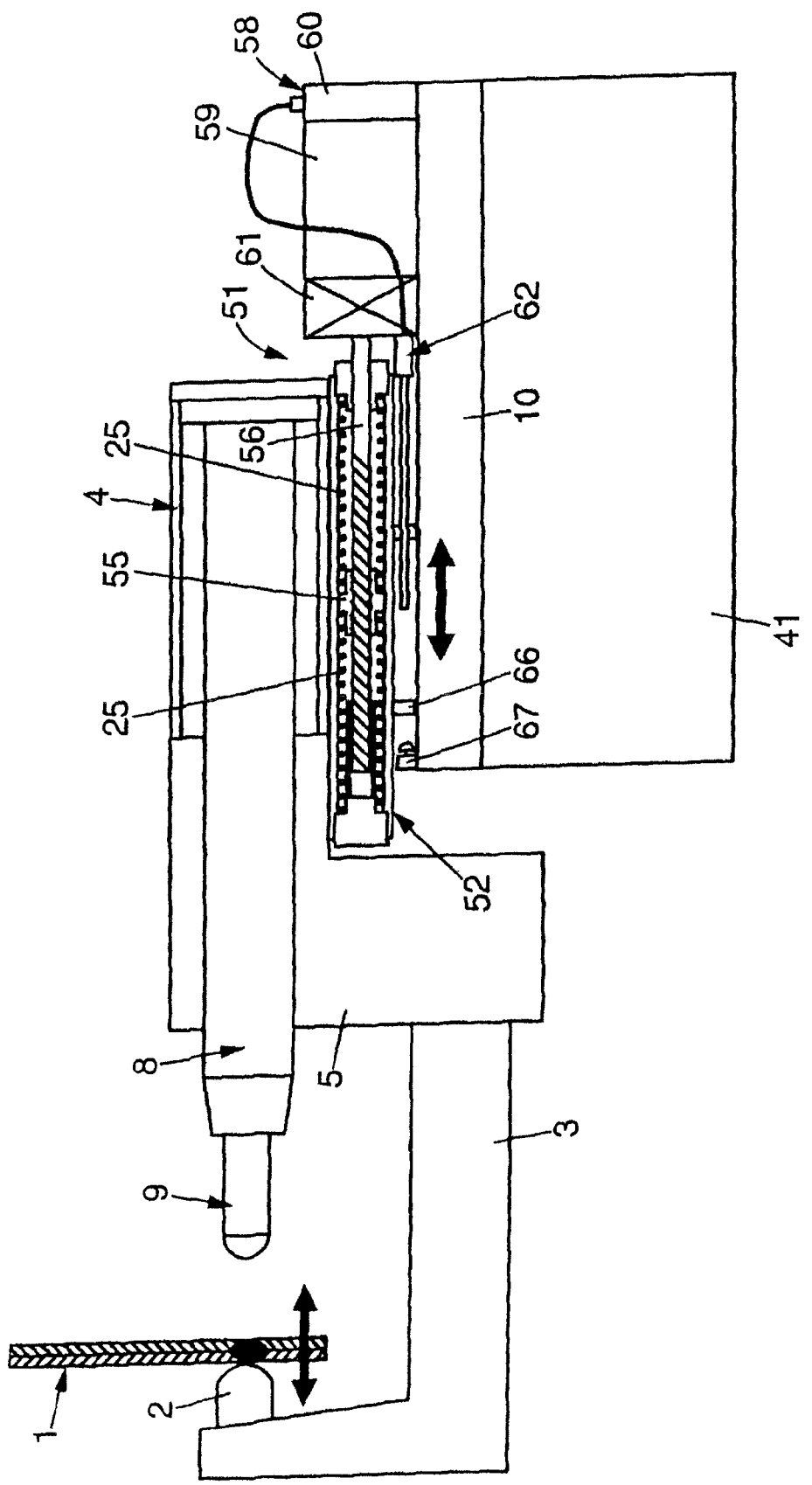
FIG. 14 is a view similar to that of FIG. 13, showing a position consecutive to that of FIG. 13, after opening of the mobile aim.
Figure 15:
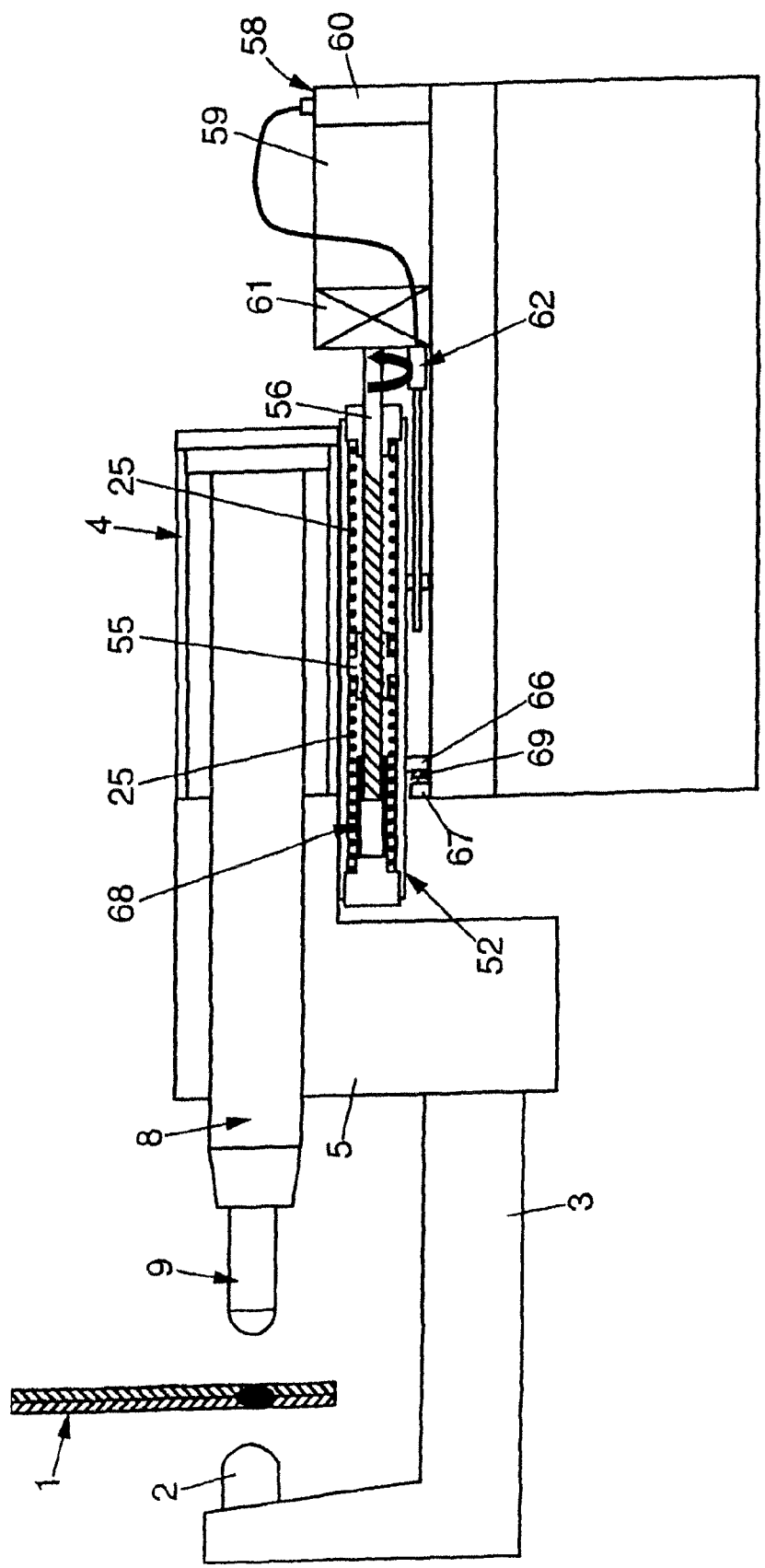
FIG. 15 is a view similar to that of FIG. 14, of the clamp during relief, in an intermediate position between those of FIGS. 14 and 16.
Figure 16:
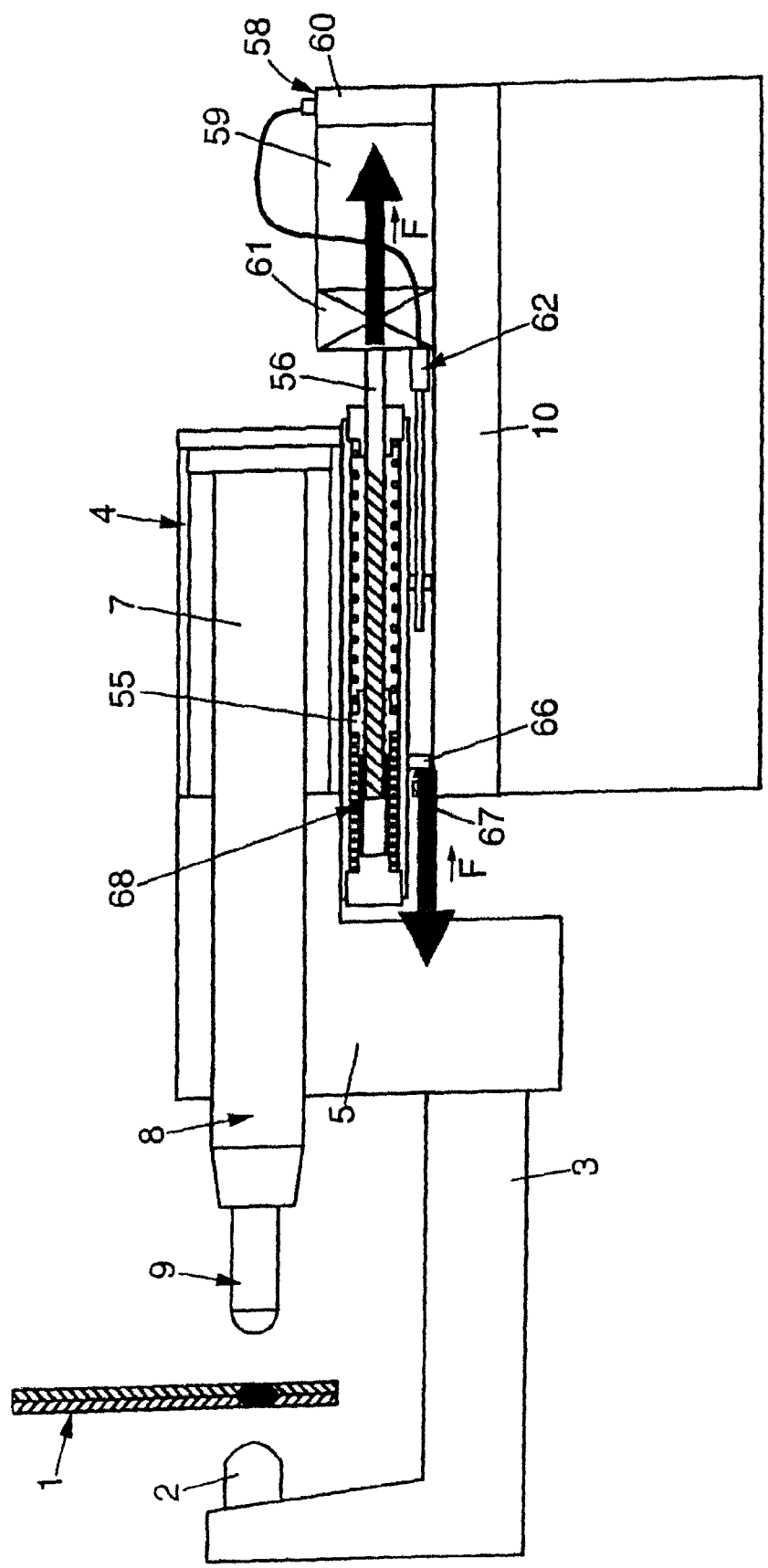
FIG. 16 is a view similar to that of FIG. 15 in the position of securing the clamp in the relief position by contact of the nut with a nut end-of-stroke stop.

Regardless of the orientation in space of the clamp, and based on a balanced position such as that of FIG. 13, the relief operation, i.e. of returning the mobile subassembly in abutment in a stationary position with respect to the support, can be performed as described in reference to FIGS. 14 to 16.

First, the reopening of the mobile arm 8 is controlled by the main actuator 4, as shown in FIG. 14, then the user gives the electronic board 60 the instruction to activate the rotation of the motor 59 so as to drive the screw-nut system 54 in the direction moving the nut 55 toward its stop 68, and therefore the direction moving the mobile subassembly (3, 4, 8) and the cassette 52 toward the relief position, by bringing, the stop 66 toward the relief stop 67. This rotation of the motor 59 can occur while the mobile arm 8 continues to open under the action of the cylinder 4. FIG. 15 shows the position in which the stop 66 of the cassette 52 comes into contact with the relief stop 67, which corresponds to a position detected by the sensor 62, and, in this state, the electrodes 2 and 9 are separated from the sheet metal assembly 1.

If the relief stop 67 is associated with or equipped with releasable gripping means of the body 22 of the cassette 52, and therefore of the subassembly (3, 4, 8), which is secured to said body 22, the gripping means shown diagrammatically in 69 can be an electromagnet or an electromagnetic or pneumatic suction alone or combined with a mechanical gripping system, in which the assembly formed by the body 22 of the cassette 52 and the mobile subassembly (3, 4, 8) is locked in translation in this position by these gripping means 69, which then hold the stop 66 of the cassette 52, and the rotation of the motor 59 can be interrupted. Then, to enable the movement of the cassette 52 toward the balancing position, the (gripping means 69 are controlled or actuated so as to release the cassette 52 and the stop 66.

By contrast, without releasable gripping means, to secure the position of the mobile subassembly (3, 4, 8), the rotation of the motor 59 and therefore of the screw-nut system 54 is continued until the nut 55 comes into contact with the stop 68 for stopping said nut in translation on the screw 56, as shown in FIG. 16. The clamp is then locked in translation, and the rotation of the motor 59 is stopped by the relief position detected by the position sensor 62 as well as by the increase in the motor torque or by another sensor indicating that the nut 55 and the stop 68 are in contact. As the motor 59 advantageously integrates, as already mentioned above, a torque limiter or a position sensor after the stop 66 comes into contact with the relief stop 67, then after the nut 55 comes into contact with the stop 68 limiting the stroke of said nut 55, the torque limiter or position sensor enables the electrical supply of the motor 59 to be cut off and activates the application of the safety brake 61, so as to lock the motor 59 in its position, and therefore also the screw-nut system 54 without any risk of overheating.

Consequently, the balancing system is therefore also capable of bringing, owing to the balancing actuator 58, the mobile subassembly (3, 4, 8) into a stationary reference position, which is the relief position, with respect to the frame 10, and therefore also the support of the clamp to which said frame is secured, in this example.

It is also understood that, in general, the balancing system is capable of locking the mobile subassembly (3, 4, 8) in a position with respect to the support, which corresponds to a blocking of the additional degree of freedom.

The securing of the relief position requires a certain thrust force F on the stop 67, and this axial force must be supported by the motor 59. Therefore, to limit the heating of the motor, the action of the safety brake 61 of the motor 59 is activated, as indicated above, owing to the torque limiter or the signal from the sensor indicating that the nut 55 and the stop 68 have come into contact, in order to secure this relief position.

Figure 17:
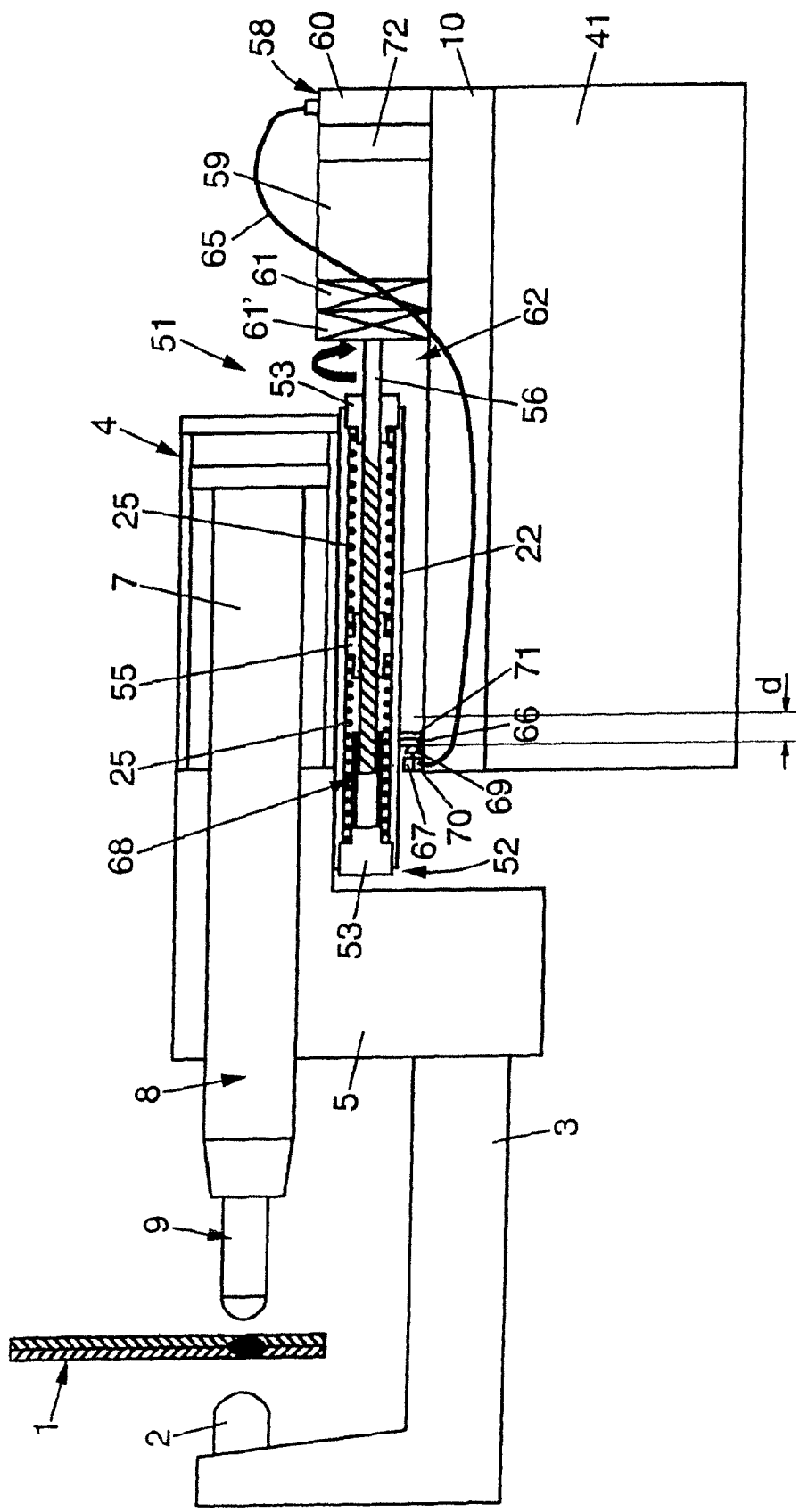
FIG. 17 is a view similar to that of FIG. 16 of a clamp without a linear position sensor, and during movement of the load to its balanced position, by the action of the balancing actuator.

In the alternative of the balancing module 51 according to FIG. 17, the continuous and linear position sensor 62 of FIGS. 5 and 7 to 16 is replaced by a detector assembly comprising an end-of-stroke sensor 70, associated or integrated with the relief stop 67, and detecting the presence or absence of a mobile contact 71, associated or integrated with the stop 66 of the cassette 52. The signal of the sensor 70 is transmitted by the line 65 to the control board 60, also receiving a signal from a coder 72 associated with the motor 59 in order to detect the number of rotations performed by the motor 59 from the moment that the stop 66 and the mobile contact 71 move away from the relief stop 67 and the end-of-stroke sensor 70, during a movement of the cassette 52 from the relief position to the balancing position, so as to stop the rotation of the motor 59 when the stop 66 is at the predetermined distance "d" from the relief stop 67. As in the previous example, if the relief position is secured by the nut 55 brought into contact with the stop 68 limiting its stroke, in the first portion of the movement from the relief position to the balanced position, the nut 55 of the screw-nut system 54 returns to the balancing position of the cassette 52 under the action of the two opposing springs 25. Then, from this position, the mobile subassembly (3, 4, 8) moves in translation, with the stop 66 moving away from the stop 67, and, without modifying the orientation of the clamp, the movement of the mobile subassembly (3, 4, 8) corresponds to the movement of the nut 55. From this position, the end-of-stroke sensor 70 detects the movement of the load with the cassette 52, the stop 66 and the mobile contact 71, and the control board 60 receives this information from the sensor 70, and the motor 59 under the control of the coder 72 seeks the balancing position, which corresponds to a movement of the nut 55 by this distance "d" white the balancing movement is taking place. The closing of the mobile arm 8 can optionally be controlled by the welding actuator 4, so that the clamp is closed as soon as possible once the balancing distance "d" has been reached, and the rotation of the motor 59 is stopped.

After a welding point, the clamp can return to its abutment in the relief position, by the rotation in the opposite direction of the motor 59 and the screw 56, and the movement of the nut 55 toward its stop 68, independently of the orientation of the clamp, preferably after having controlled a start of opening of the clamp (retraction of the mobile arm 8 into the body 5 of the actuator 4). The end-of-stroke sensor 70 detects the return of the mobile subassembly (3, 4, 8) to the relief position when the stop 66 of the cassette 52 with the mobile contact 71 comes into contact with the relief stop 67, with a locking in this position by the gripping means 69, if they exist, enabling a releasable attachment of the cassette 52 against the stop 67, or, in the absence of gripping means 69, securing of the relief position by continued rotation of the motor 59 until the nut 55 is brought against its movement limiting stop 68, after which the motor 59 is stopped, and the brake 61 is possibly applied. This embodiment, in which the continuous linear sensor is replaced by an end-of-stroke sensor 70 with a mobile contact 71 indicating that the load is in contact with the relief stop 67 or has left the latter, and is therefore balanced in the cassette, has the advantage of reducing the risk of oscillation of the load in the cassette 52. The coder 72 associated with the motor 59 then enables the nut 55 to be positioned according to the distance "d" to be observed. Although this embodiment is valid only if the orientation of the clamp is not modified during the balancing phase, it is of great value because, in practice, this is the case in the large majority of resistance welding applications.

Figure 18:
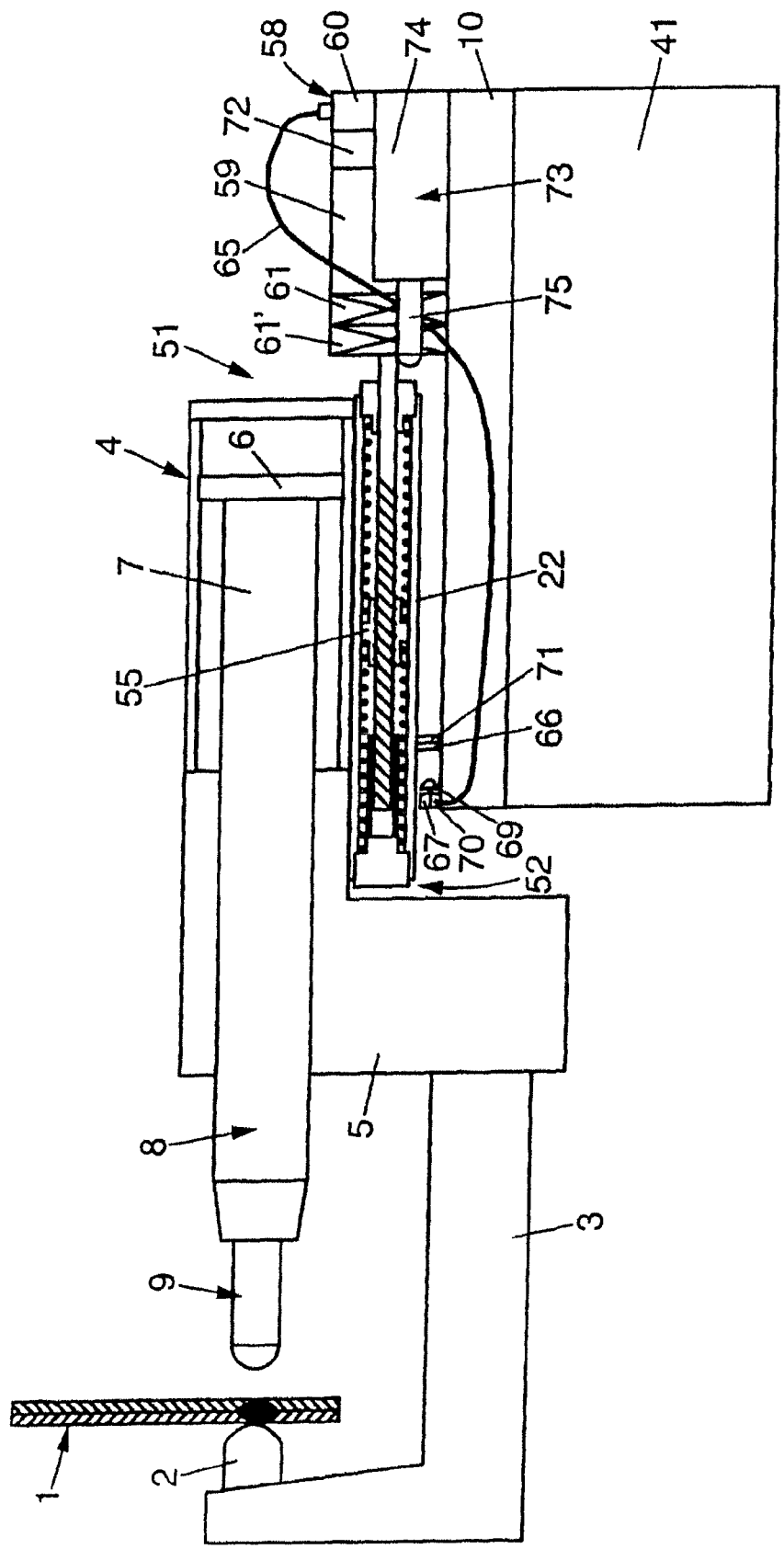
FIG. 18 is a view similar to that of FIG. 17 of a clamp with an auxiliary relief actuator, and in a balancing and docking position.
Figure 19:
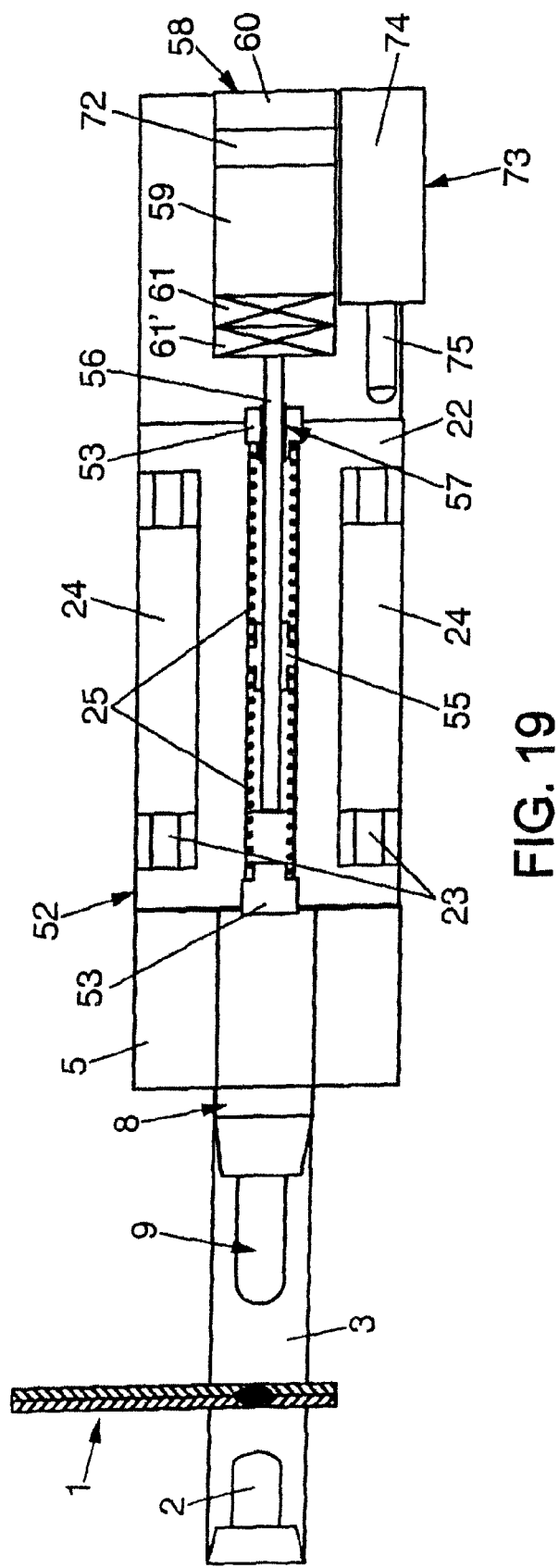
FIG. 19 is a view similar to that of FIG. 6 of the clamp with the auxiliary relief actuator of FIG. 18.
Figure 20:
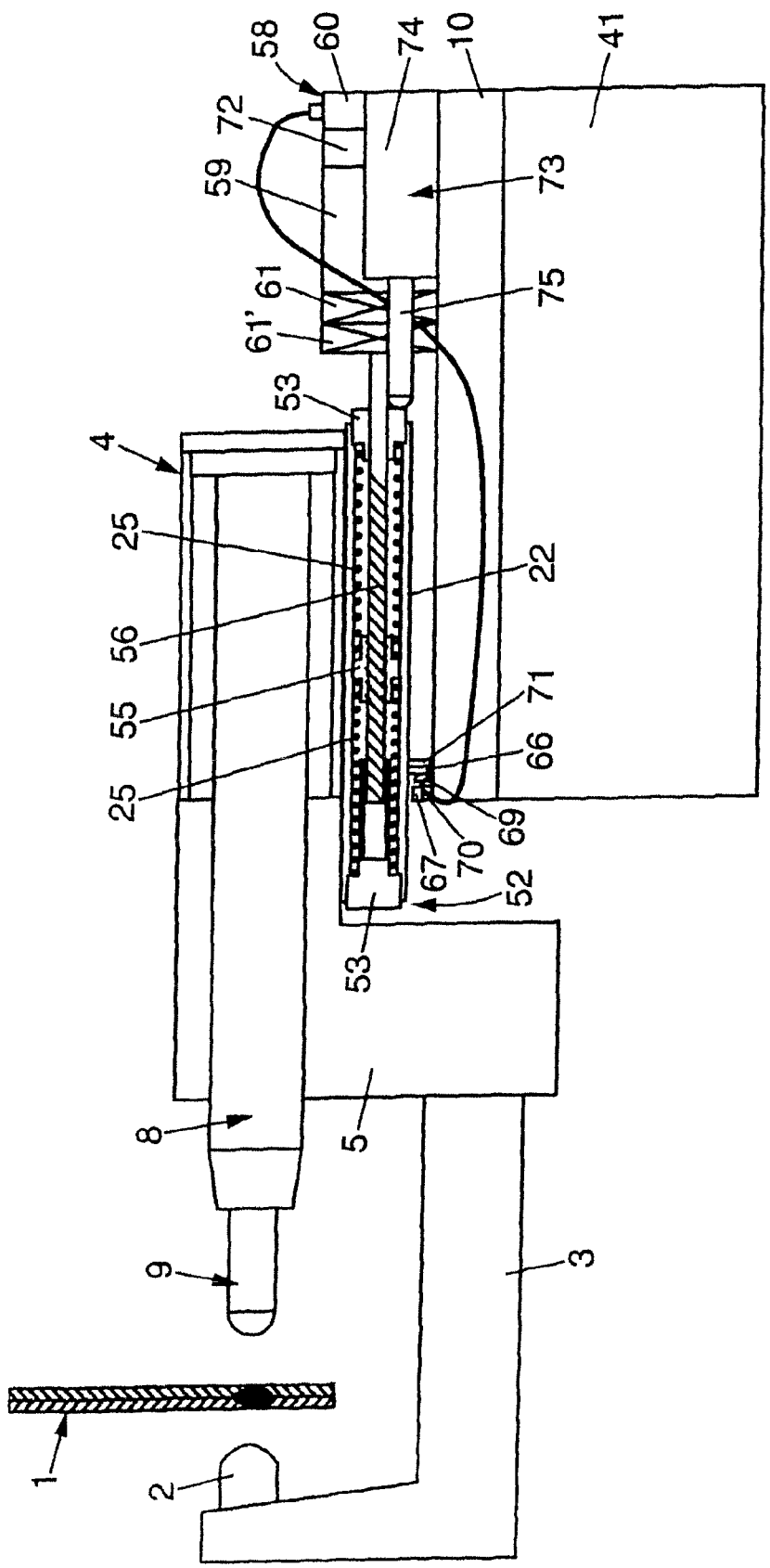
FIG. 20 is a view similar to that of FIG. 18 of the clamp in the relief position by the auxiliary relief actuator, and without control of the balancing actuator.

FIGS. 18 to 20 show an alternative of the embodiment of FIG. 17, in which the clamp is equipped with a balancing module 51 including, in addition, a relief actuator 73, produced in the form of an auxiliary linear actuator, of which the direction of action is parallel to the screw 56 of the screw-nut system 54, and which enables the cassette 52 to be moved with the mobile subassembly (3, 4, 8) from the balancing position to the relief position. i.e. to bring the stop 66 of the cassette 52 against the relief stop 67, without having to drive the motor 59. In a simple embodiment, this relief actuator 73 is a single-effect actuator, of a well known type, such as a mechanical cylinder or a fluidic actuating cylinder, with resilient return, for example owing to at least one spring, in an initial resting position, in which the rod 75 of said actuator 73 is resiliently returned axially into a tubular actuator body 74, for example laterally attached to the body of the balancing actuator 58. This actuator 73 acts as a pusher, because the control of the exit of its rod 75 out of its body 74 enables, as shown in FIG. 20, the body 22 of the cassette 52 to be pushed away and the mobile subassembly (3, 4, 8) to be replaced in contact by the stop 66 of the cassette 52 against the relief stop 67, without urging the balancing actuator 58, Optionally, the operation of the relief actuator 73 can be synchronized with that of the gripping or releasable attachment means 69, so that the relief actuator 73, of the single-effect type, can be resiliently returned to the initial position once the gripping means 69 have been actuated in order to hold the stop 66 against the relief stop 67.

Alternatively, it is also possible to eliminate the gripping means 69 by replacing them by maintaining the rod 75 extraction command of the relief actuator 73. This therefore makes it possible to ensure the permanence of the contact between the relief stop 67 and the stop 66 of the cassette.

In this example, the relief actuator 73 and the gripping means 69 form auxiliary means by which the mobile subassembly (3, 4, 8) can be maintained in abutment in the relief position without the nut 55 of the screw-nut system 54 needing to reach the end-of-stroke. Advantageously, owing to the use of an inclinometer as described in patents EP 1 078 707 and FR 2 797 794 of the applicant, it is possible to inform the balancing module 51 about the change in tilt of the clamp in space. As the balancing actuator 58 no longer has the function of holding the mobile subassembly (3, 4, 8) in the initial reference position, or the relief position, this actuator 58 can anticipate the correct positioning of the nut 55 of the screw-nut system 54 with respect to the balancing position, synchronously with the movements of the robot. As the nut 55 has already been pre-positioned, when the balancing function is commanded, the mobile subassembly (3, 4, 8) can be pulled by one of the springs 25, and no longer pushed by the nut 55, to its balancing position, which enables the response time of the balancing module 51 to be very significantly reduced. In the embodiments of FIGS. 17 to 20, as the load is balanced in the cassette 52, the balancing of the load is in fact ensured once the cassette 52 is separated by its stop 66 from the relief stop 67. Around this position, the flexibility of the balancing system is preserved, so that, when the clamp closes on the sheet metal 1, the clamp can easily be self-centered with reduced stress on the sheet metal assembly L. Among the numerous advantages of such a balancing system, in particular the operational capacity of the system regardless of the orientation of the tool in space, and the absence of a need for pressurized fluid, in particular compressed air, for its operation, the advantage lying in the fact that the cassette 52 produced with limited dimensions enables good balancing flexibility to be preserved even with large tool masses, is a particularly important advantage, with the consequence of enabling the clamp to be balanced with a larger number of components secured in movement to the mobile subassembly (3, 4, 8). In particular, for welding clamps, the consequence is that a welding transformer 41 is integrated in the mobile subassembly, so that the balancing module 51 can be offset outside the assembly formed by the mobile subassembly (3, 4, 8) and the frame 10, to which the welding transformer 41 is secured, in the embodiments according to FIGS. 5 to 20. Two examples of clamps with an offset balancing module will now be described in reference to FIGS. 21 to 24, with FIGS. 21 and 22 concerning a C-clamp and FIGS. 23 and 24 concerning an X-clamp.

In FIGS. 21 to 24, the same numeric references are used to designate the same identical or equivalent components of the clamps of the invention as those of the prior art, and the balancing module of the invention as described above.

According to FIGS. 21 to 24, the balancing module 51 is mounted as an interface between the support (39, 40) and the frame 10, secured to the body 5 of the welding actuator 4, and therefore the mobile subassembly (3, 4, 8) of the clamp. In these examples of FIGS. 21 to 24, the balancing module 51 is transferred, in the form of an independent module 51, to one of the sides of the actual clamp, as an interface between the frame 10 and the support (39-40).

Figure 21:
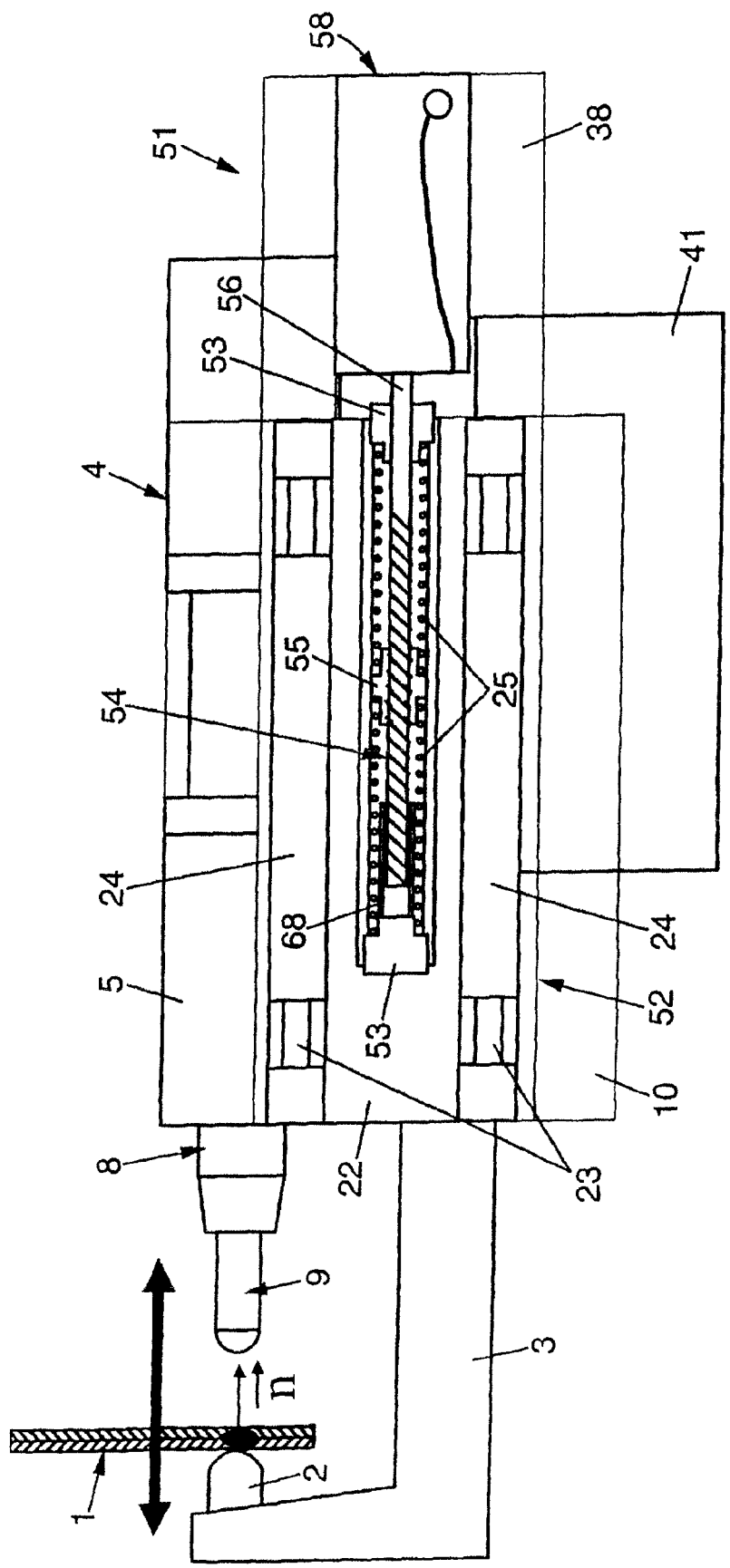
FIG. 21 is a diagrammatic partial lateral elevation and partial cross-section view of a C-clamp with a balancing module according to the invention, with a placement of the balancing module on one side of the clamp and with linear guidance parallel to the vector $\vec{n}$ normal to the plane of the sheet metal assembly.
Figure 22:
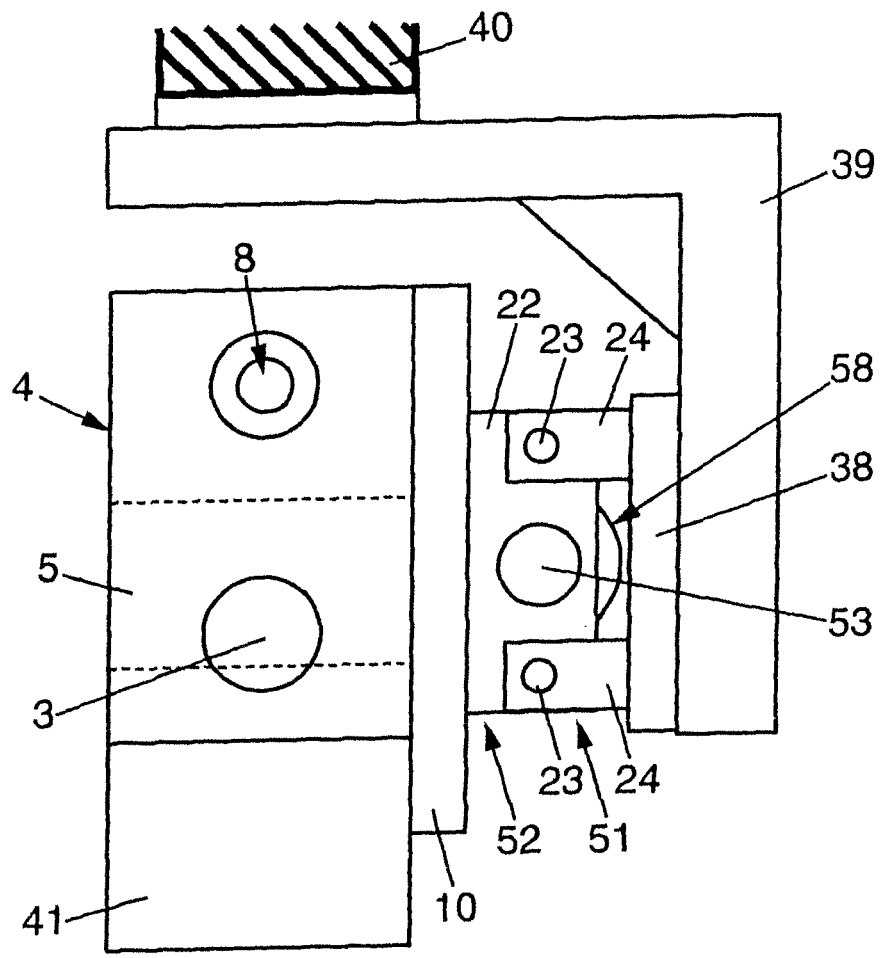
FIG. 22 is a diagrammatic frontal view of the C-clamp with a balancing module according to the invention of FIG. 21.

The C-clamp, with the balancing nodule 51 of FIGS. 21 and 22 has the actual clamp frame and the same balancing module frame 51 as the clamps described above in reference to FIGS. 5 to 20, with the only differences being that the frame 10 is made in the form of a vertical plate directly secured to one side of the body 5 of the welding actuator 4, which supports the stationary arm 3 and which linearly moves the mobile arm 8, in which the body 22 of the balancing cassette 52 is directly secured to the face of the frame plate 10 on the side opposite the face of the connection of this frame plate 10 to the mobile subassembly (2, 3, 4, 8, 9), and the balancing actuator 58 is directly secured to a vertical plate 38, itself secured to the vertical portion of a rigid corner plate 39, forming a support element 40 of the clamp, which support 40 can be, as already mentioned, either a stationary foot or a manipulating arm. Another difference is that the two sleeves 24, in which guided in longitudinal translation, parallel to the direction of movement of the mobile arm 8, are the two guide columns 23 of the balancing cassette 52, which are rigidly connected to the plate 38 of the support. Thus the screw-nut system 54 driven by the actuator 58 with a motor 59 moves the body 22 and the guide columns 23 of the balancing cassette 52 by sliding into the sleeves 24 secured to the support 38-40, parallel to the direction of movement of the mobile arm 8 and electrode 9.

Thus, the cassette 52, and more generally the balancing module 51, is mounted on one of the sides of the assembly formed by the mobile subassembly (2, 3, 4, 8, 9) and the frame 10 of the clamp, with its guidance parallel to the vector $\vec{n}$ normal to the plane of the sheet metal assembly 1. It is clear that the operation of the actual clamp and of its module 51 is identical to the operation described above in reference to FIGS. 5 to 20.

Thus, the actual welding clamp does not integrate the balancing, docking and relief functions, and the independent balancing module 51 is mounted as an interface between the actual clamp and the support, of the stationary foot or manipulating arm type.

In addition, and as is known in the prior art, a welding transformer 41 is advantageously integrated in the actual clamp, by being secured to the body 5 of the welding actuator 4 and/or the frame plate 10.

Figure 4:
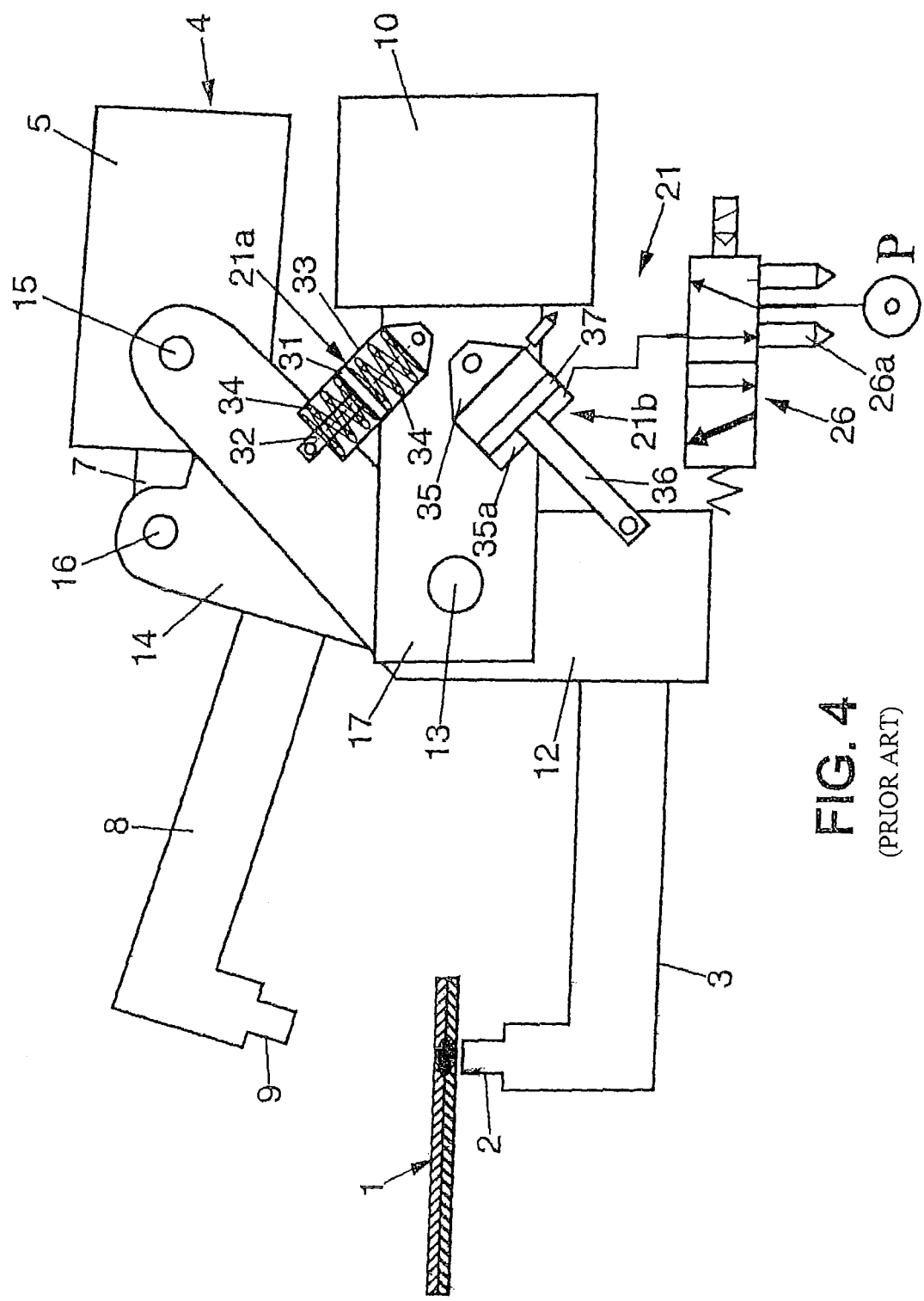
FIG. 4 is a view similar to that of FIG. 1 of an X-clamp of the prior art, with the spring balancing module, in the docking/balancing position.
Figure 23:
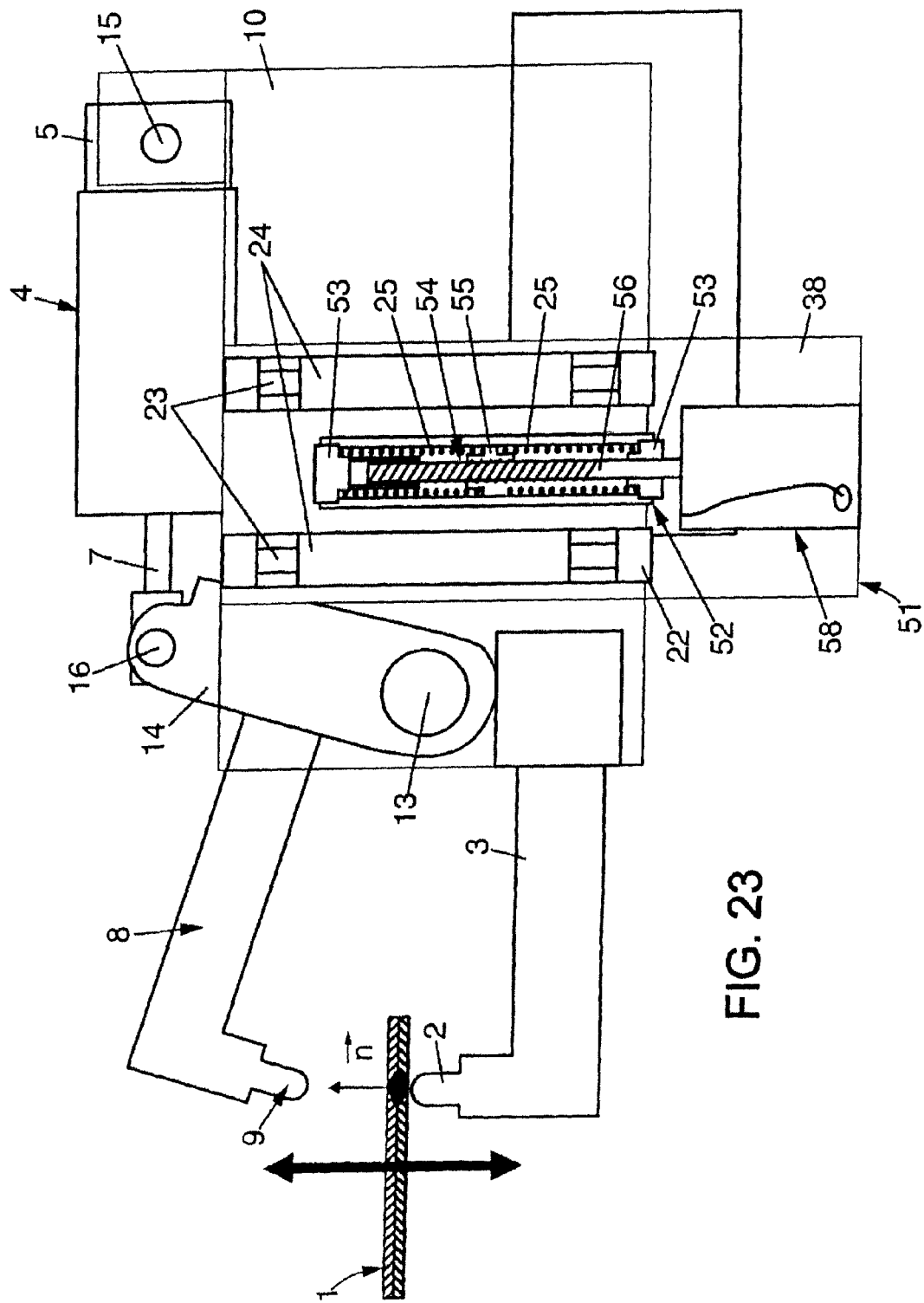
FIGS. 23 and 24 are views similar respectively to those of FIGS. 21 and 22 for an X-clamp, equipped with the same balancing module as the C-clamp of FIGS. 21 and 22, also mounted on one of the sides of the clamp and with its linear guidance parallel to the vector $\vec{n}$ perpendicular to the plane of the sheet metal assembly.
Figure 24:
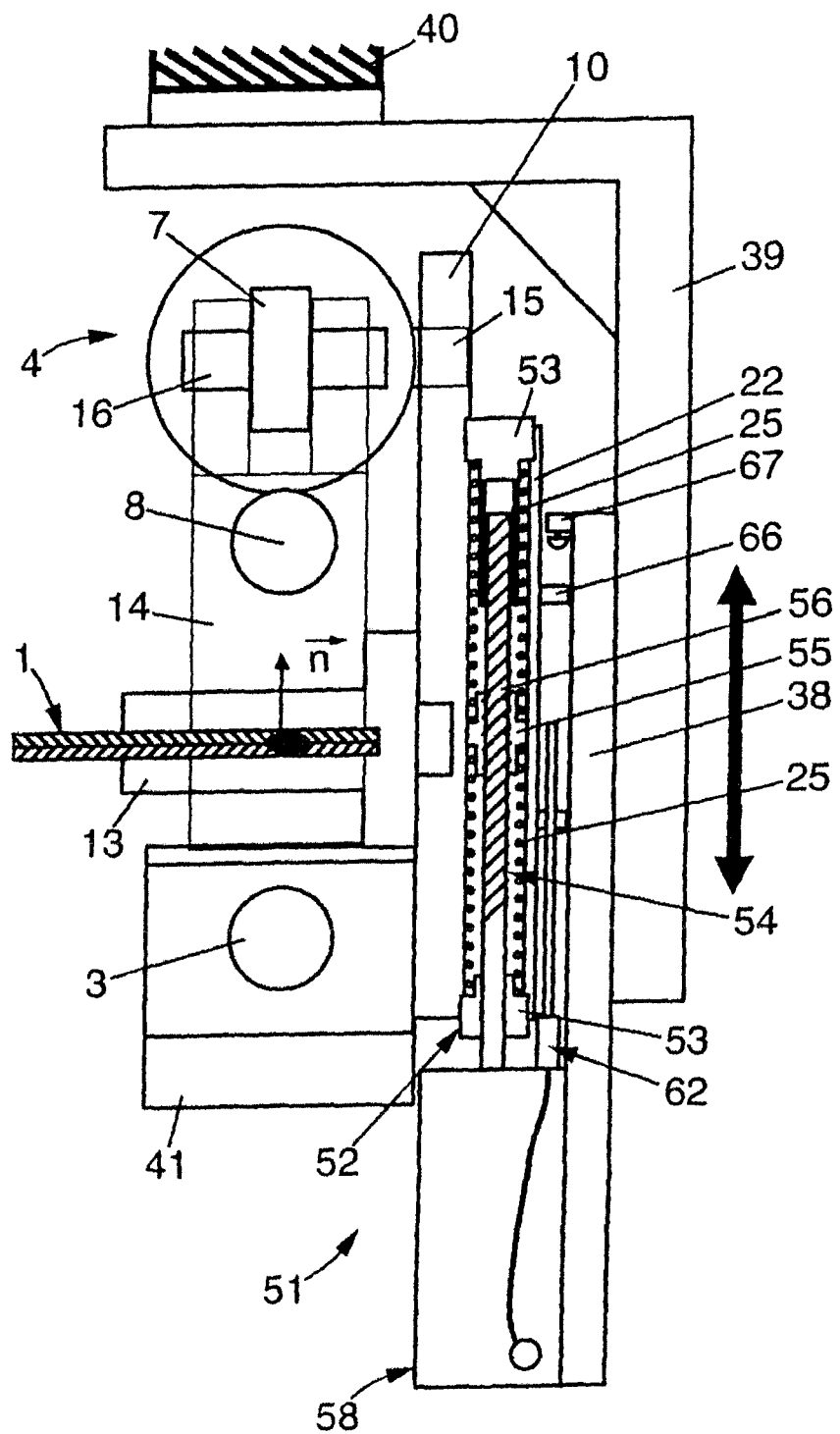

The example of FIGS. 23 and 24 is that of an X-clamp, in which the structure of the actual clamp is that of the X-clamp of FIG. 4, and which is equipped with an independent balancing module 51, identical to that of the C-clamp of FIGS. 21 and 22, but oriented at 90° with respect to the orientation of the module 51 of the example of FIGS. 21 and 22 in reference to the general direction of movement of the welding actuator 4.

Indeed, in the X-clamp of FIGS. 23 and 24, there can be found again the electrode 9 at the end of the mobile arm 8 secured to the lever 14 pivoting around the pivot pin 13 on the frame 10, rigidly connected to the stationary arm 3 with the stationary electrode 2, and on which the body 5 of the welding actuator 4 is mounted so as to pivot around the pin 15 and the rod 7 of this actuator 4 has its end also pivoting around the pin 16 on the lever 14, so that the actuator 4 controls the pivoting of the mobile arm 8 and the lever 14 around the pin 13, so as to open or close the clamp on the sheet metal assembly 1 to be welded.

By contrast, unlike in the prior art according to FIG. 4, the portion of the frame 10, to which the stationary arm 3 and the body 5 of the welding actuator 4 are rigidly secured, cannot be pivoted around the pivot pin 13, with respect to the rest of the frame 10 by are resilient balancing and guide cassette associated with a single-effect relief actuator, but the frame 10 is in the form of a vertical and lateral frame plate, on one face of which the components of the mobile subassembly are mounted, namely the stationary aim 3 and the stationary electrode 2, the mobile arm 8 with the mobile electrode 9 and the lever 14, and the welding actuator 4 as swell as the pins 13 and 15. As in FIGS. 21 and 29, a welding transformer 41 can also be attached to this face of the frame plate 10, of which the other face is rigidly connected to the body 22 of the balancing cassette 52, which is positioned so that, in this example, its two guide columns 23, parallel and spaced apart, are vertical and slide longitudinally into the two sleeves 24 secured to a race of the vertical support plate 38, itself secured by its other face to a supporting corner plate 39 rigidly connected by its upper wing to the support 40 (stationary foot or manipulating arm), in order to ensure the connection between said support 40 and the clamp, in which the balancing actuator 58 is also rigidly attached to the support plate 38, so as to drive the screw-nut system 54 in order to obtain, in this example as well, a guidance parallel to the vector $\vec{n}$ normal to the plane of the sheet metal assembly 1.

In this case as well, the balancing module 51 is mounted by the cassette 22 on one of the sides of the frame 10 of the clamp, as an interface between this frame 10 and the support plate 38, the corner plate 39 and the actual support 40, in which the corner plate 39 and/or the support plate 38 can optionally be omitted depending on the configurations of the support 40.

Alternatively, as in the example of FIGS. 21 and 22, the module 51 can be mounted as an interface between the plate 38 and the vertical wing of the corner plate 39, with the body 22 of the balancing cassette 52 being attached, for example, to the plate 38 and the two sleeves 24 and the actuator 58 being attached to the corner plate 39, or the module 51 can be mounted as an interface between the horizontal wing of the corner plate 39 and the support 40, with the body 22 of the balancing cassette 52 then being attached, for example, to the corner plate 39 and the two sleeves 24 and the actuator 58 being attached to the support 40.

In the two examples of FIGS. 21 to 24, the relief stop 67 is secured to the body 22 of the cassette 52.

Therefore, in the example of the C-clamp of FIGS. 21 and 22, as in the example of the X-clamp of FIGS. 23 and 24, the same balancing nodule 51 can allow translation movements of the mobile subassembly (2, 3, 4, 8, 9) and its frame 10 with respect to the support 40, in which the balancing actuator 58 associated with the balancing cassette 52 of this module 51 itself ensures the relief, or this function is ensured by an auxiliary actuator as described above, enabling the mobile subassembly (2, 3, 4, 8, 9) to be returned to the reference position, in abutment with respect to the support 40. In the two examples, the translation movements allowed by the module 51 are substantially perpendicular to the plane of the sheet metal assembly 1 to be welded, and are also substantially parallel to the movement of the mobile arm 8 in the example of the C-clamp of FIGS. 21 and 22, and substantially parallel to the direction of the two electrodes 2 and 9S end-to-end in the closed position of the X-clamp of FIGS. 23 and 24.

Thus, owing to a simple modification of the orientation of the balancing module 51, the system is operational upon pivoting with a linear movement (C-clamp) or a rotary movement (X-clamp). The same balancing module 51 can therefore be mounted on any type of clamp kinematics.

In these examples, the independent balancing module 51 provides a degree of freedom in translation, of which the advantages can also be obtained with an independent and offset balancing module, transposed from those described and shown in order to obtain a balancing movement by partial pivoting of the entire actual clamp (mobile subassembly and frame) around a pin.

In the clamps according to the invention, the balancing operation can therefore be obtained indifferently by a linear movement or by a rotation movement.

Figure 25:
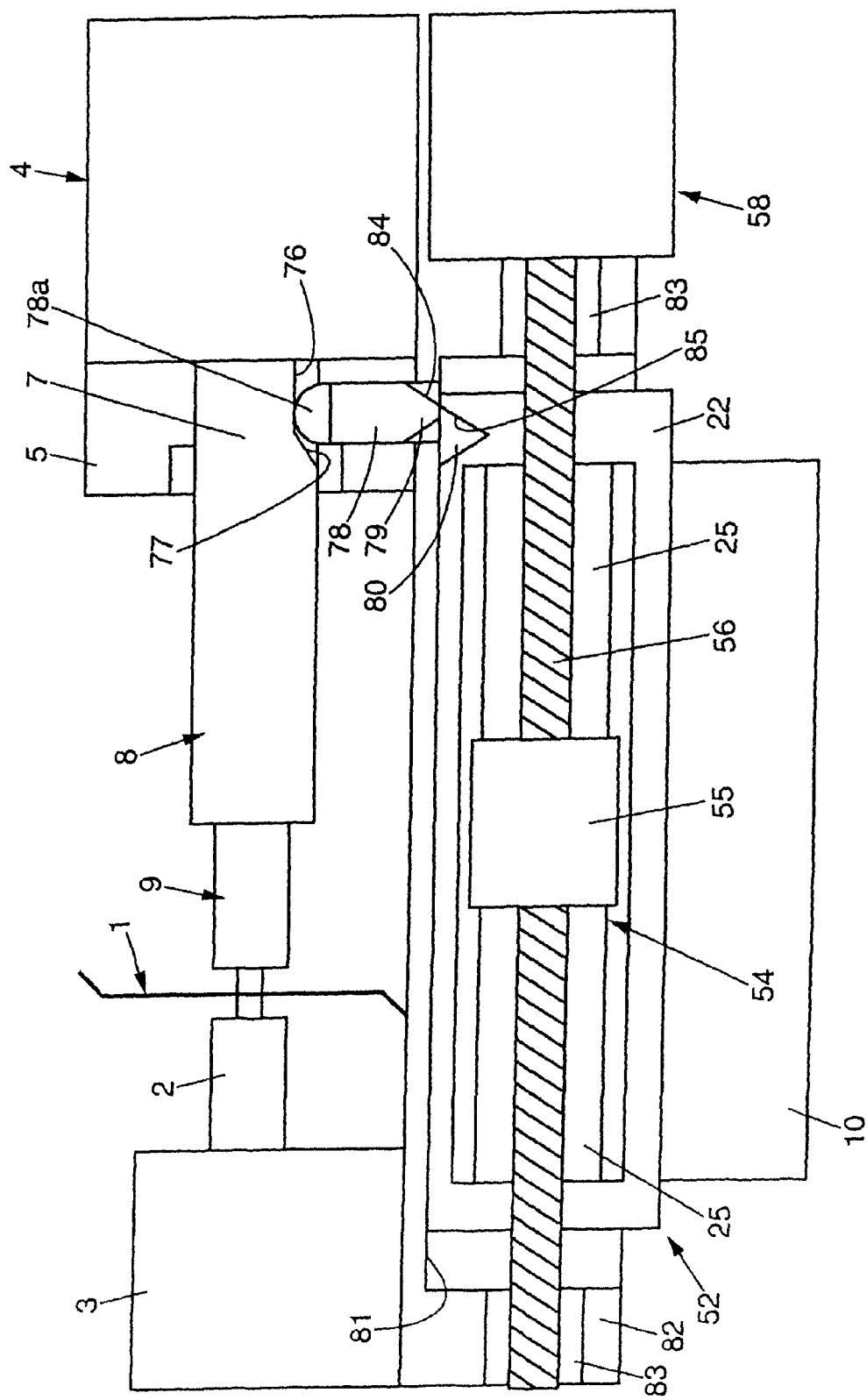
FIGS. 25 and 26 are diagrammatic partial axial cross-section and partial lateral elevation views of another example of a clamp with a balancing module according to the invention, using the main actuator as the relief actuator, respectively in the closed and balanced position, and in the open and stopped (relief) position.
Figure 26:
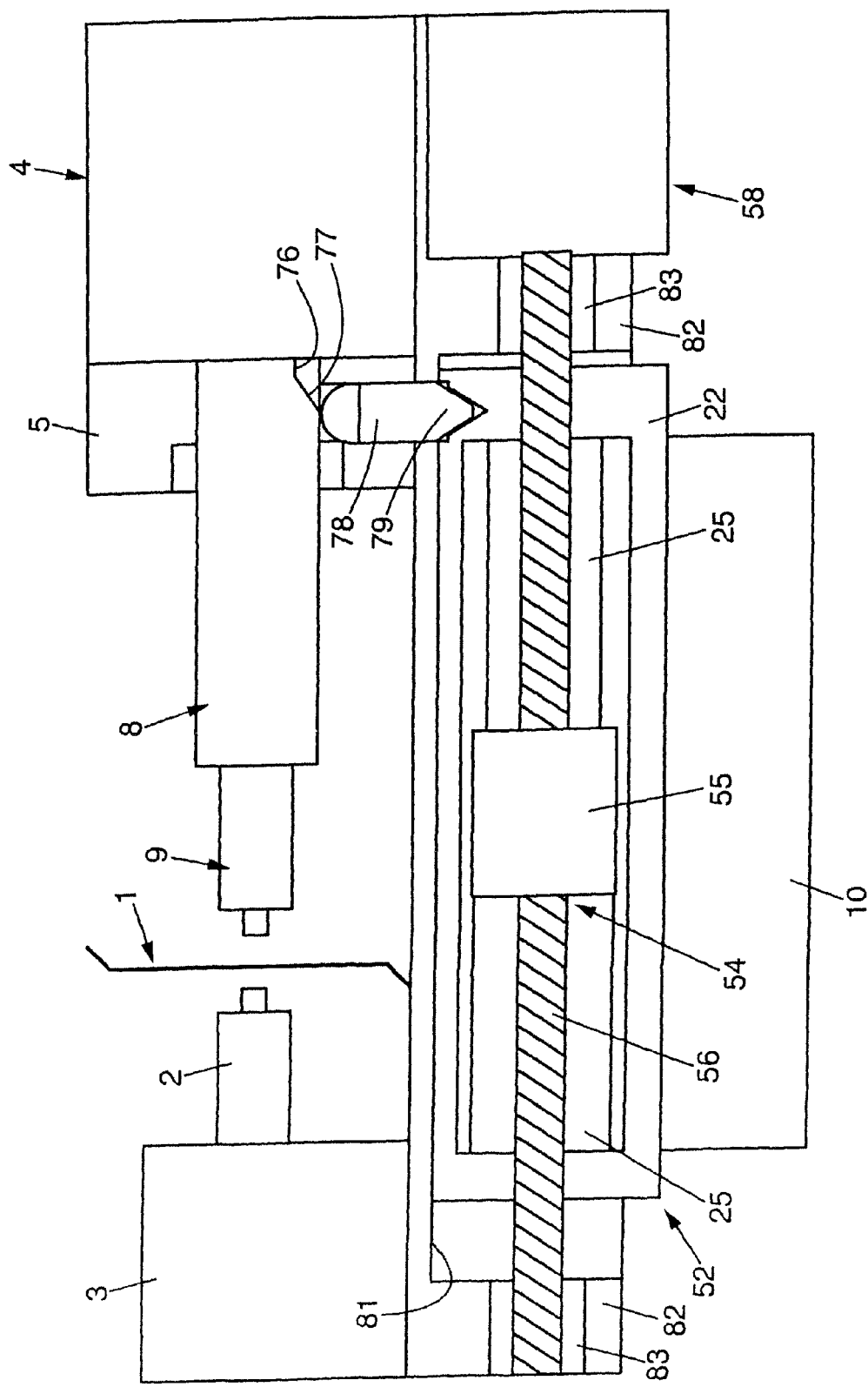

Finally, the example of a clamp in FIGS. 25 and 26 is an alternative of the C-clamp, in which the welding actuator 24 simultaneously performs the function of a relief actuator, so that the movement of the rod 7 of the welding actuator 4 is used to ensure the function of returning from the balancing position (FIG. 25) to the relief position (26) and of holding this latter position.

To this lud, the rod 7 of the welding actuator 4 comprises a longitudinal groove 76, which ends, at its end facing the mobile arm, by a tilted ramp 77 forming a cam for the rounded head 79 at the upper end (in FIGS. 25 and 26) of a pin 78 mounted so as to slide in a radial bore passing through the body 5 of the actuator 4. The other end of the pin 18 is arranged as a V-shaped end piece 79, substantially opposite, with a small longitudinal offset, a V-shaped recess 80 provided in the external face opposite the body 22 of the balancing cassette 52, in which said body 22 is, in this example, secured to the frame 10, and, by means of the latter, the support (not shown). The body 22 of the cassette 52 is engaged with axial or longitudinal clearance (parallel to the direction of translation of the mobile arm 8 with respect to the stationary arm 3) in a longitudinal recess 81 provided in the stationary arm 3 and/or the body 5 of the actuator 4 and/or a support 82 of the stationary arm 3 and the actuator 4, which thus belongs to the mobile subassembly (3, 4, 8, 82).

In the example of FIGS. 25 and 26, the screw-nut system 54 still has a nut 55 urged in opposition by two opposing springs shown diagrammatically in 25, inside of the body 22 of the cassette 52, and the screw 56 on which the nut 55 is crewed is still driven in rotation by the reversible electric motor of the balancing actuator 58, but the latter is secured to the support 82 of the stationary arm 3 and the actuator 4 of the mobile subassembly, and the screw 56 passes axially through the two longitudinal ends of the cassette 52 and is mounted by its ends in bearings 83 of this support 82.

Thus, when the mobile arm 8 and its electrode 9 are separated from the sheet metal assembly 1, upon opening of the clamp, by the retraction of the rod 7 into the body 5 of the actuator 4, the ramp 77 forming a cam pushes the head 79 of the pin 78, which is radially pushed back toward the outside of the body 5 of the actuator 4, so that its V-shaped end piece 79 penetrates the V-shaped recess 80 of the body 22 of the cassette 52. A tilted face or ramp 84 of the V-shaped end piece 79 then slides over a tilted face 85 or ramp of the V-shaped recess 80, which is slightly axially offset from the end piece 79, so that the cooperation of the two tilted faces or ramp 84 and 85 drives a longitudinal movement of the mobile subassembly (3, 4, 8, 82) with respect to the balancing cassette 52 attached to the support by means of the frame 10, in a direction opposite the direction of movement of the mobile arm 8 toward the inside of the actuator 4, which has the effect of separating the stationary electrode 2 (with the stationary arm 3 and the support 82) from the sheet metal assembly 1, and of completely opening the clamp by bringing it and holding it in the relief position of FIG. 26, without needing to urge the balancing actuator 58.

The passage from the relief position (FIG. 26) to the balanced position (FIG. 25) is obtained by commanding the extraction of the rod 7 and therefore of the mobile arm 8 with the mobile electrode 9 from the body 5 of the actuator 4, so that, under the effect of an imbalance in the load of the nut 55 by the opposing springs 25 and/or by the rotation of the screw 56 by the balancing actuator 58, a longitudinal movement 58 is caused between the mobile subassembly (3, 4, 8, 82) and the balancing cassette 52 attached to the frame 10, which has the effect, by the cooperation of the tilted faces or ramps 85 and 84 of the body 22 of the cassette 52 and the V-shaped end piece 79 of the pin 78, of radially pushing the pin 78, toward the inside of the body 5 of the actuator 4, so that its head 79 is again housed in the groove 76, thereby enabling, by balancing the two springs 25 on the nut 55, and by the rotation of the screw-nut system 54, the closing of the clamp to be controlled by moving the stationary electrode 2 and the stationary arm 3 until said closed position, in which the clamp is then balanced with a certain axial flexibility owing to the springs 25, as in the examples described above.

This embodiment also makes it possible to limit the stroke covered by the nut 55 of the screw-nut system 543 and therefore to reduce the response time as well as the wear of this system. Simultaneously, the amplitude of the frequency of alternating compression and decompression movements of the springs 25 of the cassette 52 is limited, and therefore the fatigue stress of the balancing system is also limited.

It is understood that the embodiment of FIGS. 25 and 26 can also be equipped with position detectors of one or the other of the various types described above, without it being necessary to describe them again.

The invention claimed is:

1. A clamp for gripping sheet metal and used in association with a manipulating arm, called a robot, and including:
   a rigid frame;
   a balancing actuator mounted on the rigid frame;
   a screw having a longitudinal axis extending from the balancing actuator and being driven in rotation in both directions about the longitudinal axis by the balancing actuator;
   a mobile subassembly, comprising:
   a main actuator having an actuator body,
   a stationary arm connected to the actuator body so as to remain stationary relative to the actuator body, and
   a mobile arm operatively connected to the actuator body with the main actuator being operable to move the mobile arm relative to the actuator body and the stationary arm between a closed clamp position and an open clamp position in order, respectively, to grip a sheet metal assembly between the stationary and mobile arms and to release the sheet metal assembly;
   a balancing module comprising:
   a cassette body secured to the actuator body so, as to remain stationary relative to the body of the actuator, and operatively connected to the rigid frame for axial translation of the cassette body and the mobile subassembly relative to the rigid frame and parallel to the longitudinal axis of the screw,
   a nut threaded onto the screw and placed into the cassette body to permit axial translation of the nut parallel to the longitudinal axis of the screw relative to the cassette body and the mobile subassembly, and to prevent rotation of the nut about the longitudinal axis so that the nut moves axially along the screw when the balancing actuator rotates the screw,
   a first balancing spring coupled between the upper side of the nut and the cassette body, placed into the cassette body, to urge the cassette body and the mobile subassembly in a first direction of axial translation parallel to the longitudinal axis, and
   a second balancing spring opposing the first balancing spring and coupled between a lower side of the nut and the cassette body, placed into the cassette body, to urge the cassette body and the mobile subassembly in the opposite direction of axial translation parallel to the longitudinal axis, and pre-stressed in opposition to the first balancing spring so as to urge the nut in opposition to the first balancing spring, and
   at least one position detector, capable of detecting a movement in said balancing module of a load formed by said mobile subassembly and members that are secured thereto in movement with respect to said support,
   wherein said position detector being also capable of controlling said balancing actuator in order to bring said load into a balanced position,
   said at least one position detector being a continuous position sensor, including at least one element secured to said rigid frame and connected to an electronic control circuit of said balancing actuator, and cooperating with a second element, secured to said mobile subassembly in the movements thereof.

2. The clamp according to claim 1, wherein said balancing actuator includes a reversible electric motor.

3. The clamp according to claim 1, wherein said balancing module is also capable of locking said mobile subassembly in a position with respect to said support.

4. The clamp according to claim 3, wherein said balancing module is also capable of bringing said mobile subassembly into a stationary reference position, called the relief position, with respect to said support.

5. The clamp according to claim 1, wherein said balancing actuator is capable of continuing the driving of said screw and nut after bringing a stop of said balancing module into contact with a relief end-of-stroke stop, until said nut is brought into contact with a rigid element inside said cassette body.

6. The clamp according to claim 5, wherein said rigid internal element is a stop of the nut in translation on the screw, and is intended to limit the compression on at least one of the first balancing spring and the second balancing spring.

7. The clamp according to claim 2, wherein said motor is controlled by an electronic control circuit arranged in a board directly integrated in said motor or said balancing module and is equipped with a safety brake, as well as an output reducer.

8. The clamp according to claim 1, wherein said balancing module comprises a translation guide device, comprising at least one column, parallel to the translation direction and secured in movement to one of said cassette body and said rigid frame, in which said at least one column is mounted so as to slide axially into at least one sleeve secured to the other of said rigid frame and said cassette body.

9. The clamp according to claim 8, wherein said guide device is integrated in said balancing module, and includes two columns parallel to said screw, on each side of the latter, and attached in said balancing module, so as to slide each into one of two parallel sleeves.

10. The clamp according to claim 1, further including a relief actuator, which is an auxiliary linear actuator, distinct from said balancing actuator, and with a direction of action substantially parallel to said screw, and capable of urging said balancing module with said mobile subassembly in order to move said balancing module until a stop of said module comes into contact with a relief end-of-stroke stop, and rigidly hold said mobile subassembly in this position.

11. The clamp according to claim 10, wherein said auxiliary linear actuator is a single-effect actuator with resilient return, and is attached to said balancing actuator.

12. The clamp according to claim 5, wherein said balancing actuator includes a reversible electric motor and wherein said motor comprises at least one of a torque limiter and a position sensor that, after detecting that a stop of said balancing module has come into contact with a relief end-of-stroke stop, then after detecting that said nut is abutting said stop limiting the stroke of said nut, cuts the electrical supply to said motor and activates the application of safety brake, so as to lock the motor in its position.

13. The clamp according to claim 1, wherein said balancing actuator includes a reversible electric motor and at least one position detector, capable of detecting a movement in said balancing module of a load formed by said mobile subassembly and members that are secured thereto in movement with respect to said rigid frame and wherein said at least one position detector includes an end-of-stroke sensor, integrated in or associated with a relief stop and detecting the presence or absence of mobile contact integrated or associated with a stop of said balancing module, and another position sensor of the coder type, associated with said motor in order to control a rotation of said motor positioning said stop at a predetermined distance "d" from the relief position.

14. The clamp according to claim 13, further including gripping means, capable of attaching said mobile subassembly and said balancing module in the relief position, stationary with respect to said rigid frame.

15. The clamp according to claim 14, wherein said gripping means are arranged as releasable attachment means combined with said relief end-of-stroke stop, in order to attach against the latter said stop of said balancing module, so as to maintain said mobile subassembly in the relief position.

16. The clamp according to claim 15, wherein said releasable attachment means are produced in the form of one of an electromagnet and a pneumatic or electromagnetic suction member alone or combined with a mechanical gripping system.

17. The clamp according to claim 1 further including a relief actuator formed by said main actuator of said mobile subassembly.

18. The clamp according to claim 17, wherein a rod of said main actuator bas a longitudinal recess delimited at one end by a ramp forming a cam for a head at one end of pin mounted so as to slide transversely into a bore of a-the actuator body, and of which the other end is arranged as a V-shaped end piece capable of being transversally engaged in a V-shaped recess provided in an external face of said balancing module mounted so as to be capable of moving in translation with respect to a support of said stationary arm and for guiding said mobile arm, so that the retraction of said rod of said main actuator into said body of said main actuator causes a radial movement of said pin toward an outside of said actuator body and into said V-shaped recess of said balancing module, causing, by cooperation of said V-shaped end piece of said pin and a ramp of said V-shaped recess of said system, a translation movement of said balancing module until a relief end-of-stroke stop position is reached.

19. The clamp according to claim 1, wherein said balancing module is offset outside said assembly formed by said mobile subassembly and said frame.

20. The clamp according to claim 19, wherein said balancing module is mounted as an interface between two parts of said rigid frame, of which a first part is secured to at least one of said rigid frame and said mobile subassembly, and a second part forms a remainder of said rigid frame or is secured to said remainder of said rigid frame.

21. The clamp according to claim 19, wherein said balancing module is mounted as an interface between said rigid frame and at least one of said rigid frame and said mobile subassembly.

22. The clamp according to claim 21, wherein said balancing module is attached on a side of at least one of said actuator body and said rigid frame supporting said mobile subassembly.

23. The clamp according to claim 1, wherein said balancing module is placed on a C-type clamp, with linear movement of said mobile arm with respect to said stationary arm, so that the translation movements allowed by said balancing module are substantially parallel to movements of said mobile arm, and are therefore substantially perpendicular to a plane of said sheet metal assembly.

24. The clamp according to claim 1, wherein said balancing module is placed on an X-type clamp, with a rotation movement of said mobile arm with respect to said stationary arm, so that translation movements allowed by said balancing module are substantially perpendicular to a plane of said sheet metal assembly, and are therefore substantially parallel to the direction of said two arm ends, end-to-end when the clamp is in said closed position.

25. The clamp according to claim 21, wherein said balancing module is capable of being mounted on said rigid frame, in one or the other of at least two positions allowing translation movements substantially parallel to one or the other, respectively, of at least two directions inclined with respect to one another, and preferably substantially perpendicular to one another, in the plane of an assembly face on said rigid frame, depending on whether the clamp is of the C type or of the X type, respectively with translation or rotation movements of the mobile arm with respect to said stationary arm.

26. The clamp according to claim 1, wherein the clamp is a clamp for resistance welding, and said ends, respectively, of said stationary and mobile arms are welding electrodes, in which a welding transformer is integrated in said mobile subassembly and said rigid frame, and secured to at least one of said rigid frame and said stationary arm.

27. The clamp according to claim 1, wherein the first balancing spring and the second balancing spring cause the mobile assembly to move to a balanced position relative to the nut when the screw is not rotating, and wherein the balanced position of the mobile assembly can change based on the orientation of the clamp.

28. The clamp according to claim 1, wherein axial translation of the nut when the screw rotates in either direction causes corresponding axial translation of the cassette body and the mobile subassembly in the same direction, and wherein, when the cassette body and the mobile subassembly are disposed at a limit position in the first direction of axial translation, continued rotation of the screw causes axial movement of the nut in the first direction of axial movement relative to the cassette body and the mobile subassembly.

29. A clamp for gripping sheet metal and used in association with a manipulating arm, called a robot, and including:
   a rigid frame;
   a balancing actuator mounted on the rigid frame;
   a screw having a longitudinal axis extending from the balancing actuator and being driven in rotation in both directions about the longitudinal axis by the balancing actuator;
   a mobile subassembly, comprising:
   a main actuator having an actuator body,
   a stationary arm connected to the actuator body so as to remain stationary relative to the actuator body, and
   a mobile arm operatively connected to the actuator body with the main actuator being operable to move the mobile arm relative to the actuator body and the stationary arm between a closed clamp position and an open clamp position in order, respectively, to grip a sheet metal assembly between the stationary and mobile arms and to release the sheet metal assembly;
   a balancing module comprising:
   a cassette body secured to the actuator body so, as to remain stationary relative to the body of the actuator, and operatively connected to the rigid frame for axial translation of the cassette body and the mobile subassembly relative to the rigid frame and parallel to the longitudinal axis of the screw,
   a nut threaded onto the screw and placed into the cassette body to permit axial translation of the nut parallel to the longitudinal axis of the screw relative to the cassette body and the mobile subassembly, and to prevent rotation of the nut about the longitudinal axis so that the nut moves axially along the screw when the balancing actuator rotates the screw,
   a first balancing spring coupled between the a upper side of the nut and the cassette body, placed into the cassette body, to urge the cassette body and the mobile subassembly in a first direction of axial translation parallel to the longitudinal axis, and
   a second balancing spring opposing the first balancing spring and coupled between a lower side of the nut and the cassette body, placed into the cassette body, to urge the cassette body and the mobile subassembly in the opposite direction of axial translation parallel to the longitudinal axis, and pre-stressed in opposition to the first balancing spring so as to urge the nut in opposition to the first balancing spring and
   at least one position detector, capable of detecting a movement in said balancing module of a load formed by said mobile subassembly and members that are secured thereto in movement with respect to said support.
   wherein said position detector being also capable of controlling said balancing actuator in order to bring said load into a balanced position,
   said at least one position detector being a continuous position sensor, including at least one element secured to said rigid frame and connected to an electronic control circuit of said balancing actuator, and cooperating with a second element, secured to said mobile subassembly in the movements thereof,
   the clamp further including a relief actuator formed by said main actuator of said mobile subassembly, and
   wherein a rod of said main actuator bas a longitudinal recess delimited at one end by a ramp forming a cam for a head at one end of pin mounted so as to slide transversely into a bore of a-the actuator body, and of which the other end is arranged as a V-shaped end piece capable of being transversally engaged in a V-shaped recess provided in an external face of said balancing module mounted so as to be capable of moving in translation with respect to a support of said stationary arm and for guiding said mobile arm, so that the retraction of said rod of said main actuator into said body of said main actuator causes a radial movement of said pin toward an outside of said actuator body and into said V-shaped recess of said balancing module, causing, by cooperation of said V-shaped end piece of said pin and a ramp of said V-shaped recess of said system, a translation movement of said balancing module until a relief end-of-stroke stop position is reached.

* * * * *